United States Patent
Sreetharan et al.

(10) Patent No.: US 9,038,942 B2
(45) Date of Patent: May 26, 2015

(54) PASSIVE TORQUE BALANCING IN A HIGH-FREQUENCY OSCILLATING SYSTEM

(75) Inventors: Pratheev Sabaratnam Sreetharan, Cambridge, MA (US); Robert J. Wood, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 371 days.

(21) Appl. No.: 13/519,901

(22) PCT Filed: Feb. 11, 2011

(86) PCT No.: PCT/US2011/024479
§ 371 (c)(1),
(2), (4) Date: Jun. 29, 2012

(87) PCT Pub. No.: WO2011/142864
PCT Pub. Date: Nov. 17, 2011

(65) Prior Publication Data
US 2012/0292438 A1    Nov. 22, 2012

Related U.S. Application Data

(60) Provisional application No. 61/303,629, filed on Feb. 11, 2010, provisional application No. 61/329,276, filed on Apr. 29, 2010.

(51) Int. Cl.
*B64C 33/02* (2006.01)
*B64C 33/00* (2006.01)
*B64C 39/02* (2006.01)

(52) U.S. Cl.
CPC ............ *B64C 33/02* (2013.01); *Y10T 74/18928* (2015.01); *Y10T 74/18968* (2015.01); *B64C 33/00* (2013.01); *B64C 39/028* (2013.01); *B64C 2201/025* (2013.01)

(58) Field of Classification Search
USPC ........................................ 244/11, 22, 72, 99.8
See application file for complete search history.

(56) References Cited

U.S. PATENT DOCUMENTS

| | | | | |
|---|---|---|---|---|
| 5,194,029 | A | * | 3/1993 | Kinoshita ........................ 446/35 |
| 6,082,671 | A | * | 7/2000 | Michelson ........................ 244/72 |
| 6,544,092 | B1 | * | 4/2003 | Tomas ........................ 446/35 |

(Continued)

OTHER PUBLICATIONS

Shang et al.; Artificial insectwings of diverse morphologyfor flapping-wing micro air vehicles;Aug. 27, 2009;IOP Publishing; Bioinspiriation & Biomimetics;pp. 1-6.*

(Continued)

*Primary Examiner* — Tien Dinh
*Assistant Examiner* — Michael A Fabula
(74) *Attorney, Agent, or Firm* — Modern Times Legal; Robert J. Sayre

(57) ABSTRACT

A passively torque-balanced device includes (a) a frame; (b) a drivetrain including a drive actuator mounted to the frame and configured for reciprocating displacement, an input platform configured for displacement by the drive actuator, a plurality of rigid links, including a proximate link and remote links, wherein the rigid links are collectively mounted to the frame, and a plurality of joints joining the rigid links and providing a plurality of non-fully actuated degrees of freedom for displacement of the rigid links, the plurality of joints including a fulcrum joint that is joined both to the input platform and to the proximate rigid link; and (c) at least two end effectors respectively coupled with the remote links and configured for displacement without full actuation.

20 Claims, 13 Drawing Sheets

(56) References Cited

U.S. PATENT DOCUMENTS

| | | | | |
|---|---|---|---|---|
| 6,840,477 | B2* | 1/2005 | Hamamoto et al. | 244/22 |
| 7,107,842 | B2* | 9/2006 | Wu et al. | 73/504.15 |
| 7,219,855 | B2* | 5/2007 | Hamamoto et al. | 244/72 |
| 7,341,222 | B1* | 3/2008 | Reuel et al. | 244/11 |
| 7,368,860 | B2* | 5/2008 | Wood et al. | 310/367 |
| 7,651,051 | B2* | 1/2010 | Agrawal et al. | 244/22 |
| 8,091,823 | B2* | 1/2012 | Park et al. | 244/22 |
| 2006/0006280 | A1* | 1/2006 | Wood | 244/72 |
| 2006/0102782 | A1* | 5/2006 | Earl et al. | 244/72 |
| 2006/0180953 | A1* | 8/2006 | Wood et al. | 264/328.1 |
| 2006/0181179 | A1* | 8/2006 | Wood et al. | 310/367 |
| 2007/0205322 | A1* | 9/2007 | Liao | 244/22 |
| 2007/0210207 | A1* | 9/2007 | Liao | 244/22 |
| 2007/0262194 | A1* | 11/2007 | Agrawal et al. | 244/11 |
| 2010/0308158 | A1* | 12/2010 | Park et al. | 244/22 |

OTHER PUBLICATIONS

Finio et al.; Asymmetric flapping for a robotic fly using a hybrid power-control actuator; Oct. 11-15, 2009; IEEE/RSJ International Conference on Intelligent Robots and Systems; pp. 2755-2762.*
Steltz et al.; Characterization of the Micromechanical Flying Insect by Optical Position Sensing; Apr. 2005; IEEE Internatio nal Conference on Robotics and Automation; pp. 1252-1257.*
Wood; Design, fabrication, and analysis of a 3DOF, 3cm flapping-wing MAV; Oct. 29-Nov. 2, 2007; IEEE/RSJ International Conference on Intelligent Robots and Systems;pp. 1576-1581.*
Baek et al.; Efficient Resonant Drive of Flapping Wings; Oct. 11-15, 2009; IEEE/RSJ International Conference on Intelligent Robots and Systems;pp. 2854-2860.*
Wu et al.; Halteres for the Micromechanical Flying Insect; May 2002; IEEE International Conference on Robotics & Automation; pp. 60-65.*
Avadhanula et al.; Lift Force Improvements for the Micromechanial Flying Insect; Oct. 2003; IEEE/RSJ International Conference on Intelligent Robots and Systems; pp. 1350-1356.*
Wood; Liftoff of a 60mg flapping-wing MAV; Oct. 29-Nov. 2, 2007; IEEE/RSJ International Conference on Intelligent Robots and Systems;pp. 1889-1894.*
Wood et al.; Microrobotics Using Composite Materials: The Micromechanical Flying Insect Thorax; Sep. 14-19, 2003; IEEE International Conference on Robotics & Automation;pp. 1842-1849.*
Guizzo; The Coolest Flying Robot Projects at IROS Conference;Nov. 6, 2007; IEEE; <http://spectrum.ieee.org/automatron/robotics/robotics-software/the_coolest_flying_robot_proje>.*
Yan et al.; Towards Flapping Wing Control for a Micromechanical Flying Insect; May 21-26, 2001; IEEE International Conference on Robotics & Automation;pp. 3901-3908.*
"Effector" and "Inceptor"; The Cambridge Aerospace Dictionary; Cambridge University Press;2009;Second Edition;pp. 225 and 343.*
Cox et al.; The Development of Elastodynamic Components for PiezoelectricallyActuated Flapping Micro-air Vehicles; Sep. 2002;Journal of Intelligent Material Systems and Structures ;vol. 13; pp. 611-615.*
Finio et al.; Body torque modulation for a microrobotic fly; May 12-17, 2009; IEEE International Conference on Robotics and Automation;pp. 3449-3456.*
Bruce K. Gale, et al., "Fabrication and packaging: Low-cost MEMS technologies," in Comprehensive Microsystems, 1st Ed. (2008).
Mark Gallant, "Guide to Rigid-Flex Design", Printed Circuit Design and Fab (<http://www.pcdandf.com/cms/magazine/95/2948>,visited Dec. 13, 2013) (2006).
M. Bachman, et al., "MEMS in Laminates", IEEE Electronic Components and Technology Conf. 262-267 (May/Jun. 2011).
All Flex Flexible Circuits, LLC, "Rigid Flex Circuits" <http://www.allflexinc.com/DesignGuide/rigid-flex.shtml> (accessed on Jan. 13, 2014) (2011).
Fearing, R.S., et al., "Wing transmission for a micromechanical flying insect", IEEE International Conference on Robotics and Automation, (2000), pp. 1509-1516.
Wood, R.J., et al., "Microrobot Design Using Fiber Reinforced Composites", Journal of Mechanical Design, 130(5), (2008), p. 052304.
Wood, Robert J. "The First Takeoff of a Biologically Inspired At-Scale Robotic Insect", IEEE Transactions on Robotics, vol. 24, No. 2, (Apr. 1, 2008), pp. 341-347.
Sreetharan, P.S., et al., "Passive Aerodynamic Drag Balancing in a Flapping-Wing Robotic Insect", Journal of Mechanical Design, vol. 132, (May 2010), p. 051006.
Sreetharan, P.S., et al., "Passive torque regulation in an underactuated flapping wing robotic insect", Autonomous Robots, vol. 31, Nos. 2-3, (2011), pp. 225-234.
European Patent Office, International Search Report and Written Opinion for PCT/US2011/024479 (Mar. 27, 2012).

* cited by examiner

US 9,038,942 B2

PASSIVE TORQUE BALANCING IN A HIGH-FREQUENCY OSCILLATING SYSTEM

GOVERNMENT SUPPORT

The invention was supported, in whole or in part, by Grant No. CMMI-0746638 from the National Science Foundation. The United States Government has certain rights in the invention.

BACKGROUND

Biological insects are among nature's most nimble fliers, but the kinematic and aerodynamic mechanisms that enable their flight remain an active area of research. Much progress has been made in understanding the biological form and function of flight-capable insects as well as the aerodynamic properties of flapping wing flight, though much remains to be discovered.

Developments in millimeter-scale fabrication processes have led to progress towards creating micro-robotic insects based on their biological counterparts. Insects of the order Diptera have inspired several projects to create similarly scaled micro air vehicles (MAV), including Berkeley's Micromechanical Flying Insect (MFI) [see R. S. Fearing, et al., "Wing transmission for a micromechanical flying insect," J. Micromechatronics, 1(3), 221-237 (2001)] and the Harvard Microrobotic Fly (HMF) [see R. J. Wood, "The first takeoff of a biologically inspired at-scale robotic insect," IEEE Trans. Rob., 24, 341-347 (2008)].

Generating aerodynamic forces of a sufficient magnitude is a primary concern for both biological and micro-robotic fliers, Though hovering and executing flight maneuvers also require subtle control over these forces. While a recent demonstration has shown that the HMF design generates sufficient lift to support the mass of its aeromechanical structure, additional mechanisms allowing control over the aerodynamic forces produced by the wings are necessary in order to achieve stable flight.

The addition of kinematic control inputs has been demonstrated to enable active control over the stroke amplitude of each wing of an at-scale microrobotic insect, though not yet on a flight-worthy platform. Evidence exists that biological organisms similarly use flight control muscles to actively apply kinematic perturbations to their wing trajectories, though the complete behavior of these muscles in Dipteran insects is not yet fully understood.

Existing flapping-wing micro air vehicle platforms, including the MFI, the HMF, and others, such as University of Tokyo's butterfly-type ornithopter, the Microbat, Delfly from the Delft University of Technology, and micro air vehicles from the University of Delaware, enforce a kinematic relationship between power-actuation strokes and wing-stroke angles.

SUMMARY

Described herein are passively torque-balanced devices and methods that can be used in a variety of applications, including micro-robotic flight devices.

The device includes a frame, an under-actuated drivetrain, and at least two end effectors. The drivetrain includes the following: a drive actuator mounted to the frame and configured for reciprocating displacement; an input platform configured for displacement by the drive actuator; a plurality of rigid links, including a proximate link and remote links, wherein the rigid links are collectively mounted to the frame; and a plurality of joints joining the rigid links and providing a plurality of non-fully actuated degrees of freedom for displacement of the rigid links (i.e., with movement only indirectly influenced by an actuator), wherein the plurality of joints include a fulcrum joint that is joined both to the input platform and to the proximate rigid link. The end effectors are respectively coupled with the remote links and configured for displacement without full actuation (i.e., without having actuators directly controlling each degree of freedom of end-effector displacement).

The devices and methods described herein are particularly applicable to airborne micro-robotic platforms of a size similar to that of Dipteran insects (e.g., with dimensions less than 10 cm). The drivetrains of these devices exhibit Passive Aeromechanical Regulation of Imbalanced Torques (PARITy) and will be referred to as the PARITy drivetrain, or simply the PARITy, herein. The PARITy drivetrain delivers power from a single actuator to two wings in a manner that passively balances the aerodynamic drag torques created at each flapping wing. Embodiments of the device designed for micro-robotic flight can have just a single drive actuator and can be structured such that the single drive actuator is not co-located with at least four degrees of freedom in the system; specifically, the two wing stroke angles and the two wing rotation angles are not actuated with direct force from the drive actuator, though the two wing rotation angles can optionally be driven by auxiliary actuators. Additionally, the joints provide at least three non-fully actuated degrees of freedom for displacement of the rigid links.

Moreover, additional components can be mounted to the frame to provide additional functionalities. Exemplary auxiliary components include a camera 66, a sensor 68, a pollen attractor, a microprocessor (electronically coupled with camera, sensor, etc.), an electronic communication transmitter 70 coupled with the microprocessor (for transmitting data from the camera 66 sensor 68, etc., to a remote communication center), and an electronic communication receiver 72 for receiving instructions (e.g., for steering or for directing the camera 66) from a remote communication center.

The PARITy drivetrain design introduces a paradigm for controlling the aerodynamic forces created by flapping wings. In contrast with designs that produce deterministic kinematic relationships between actuation strokes and wing-stroke angles, the PARITy design creates deterministic relationships between the aerodynamic forces experienced by each wing. This behavior is realized by introducing additional degrees of freedom to the system, causing the relationship between wing trajectory and actuation stroke to be kinematically under-constrained. During operation of the PARITy, tuned system dynamics passively alter wing trajectories in a manner that enforces the desired relationships between aerodynamic forces at each wing. Under this paradigm, flight control strategies can focus on changing system dynamics to alter the enforced force relationships. Incorporating these mechanical features that dynamically respond to aerodynamic forces may alleviate requirements on flight control systems for mass- and power-limited aeromechanical platforms.

In these configurations, the PARITy works with two degrees of freedom represented by the wing stroke angles. We express these two degrees of freedom in a different form by allowing $q_1$ to be the sum (or equivalently the average) of wing stroke angles, while $q_2$ is the difference between the wing stroke angles. A fundamental feature of the PARITy is that $q_1$ (the average stroke angle) is directly actuated, while the difference, $q_2$, is unactuated. The fact that the difference of stroke angles can passively vary without actuation allows for torque balancing.

Moreover, the PARITy drivetrain's tuned dynamic behavior can be realized with negligible increases in kinematic complexity and system mass, as compared to the baseline HMF design.

BRIEF DESCRIPTION OF THE DRAWINGS

FIGS. 18 and 19 illustrate the left wing membrane used in the control trial, where $\Omega_{Control}^L = 31.3$ mg·mm$^2$; FIGS. 20 and 21 illustrates the left wing membrane used in the one-cut trial, where $\Omega_{1-Cut}^L = 18.8$ mg·mm$^2$; and FIGS. 22 and 23 illustrates the left wing membrane used in the two-cut trial, where $\Omega_{2-Cut}^L = 13.2$ mg·mm$^2$.

In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
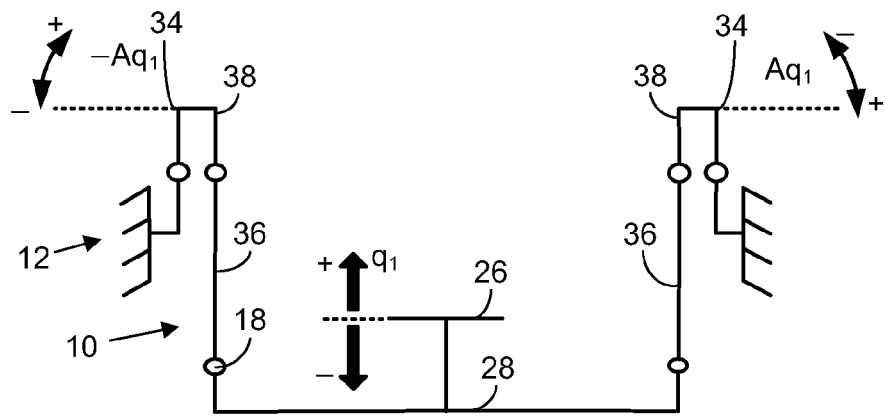
FIG. 1 is a kinematic diagram of a simple HMF transmission.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 0.1%, 1% or 2% by weight or volume) can be understood as being within the scope of the description; likewise, if a particular shape is referenced, the shape is intended to include imperfect variations from ideal shapes, e.g., due to machining tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "upper," "beneath," "below," "lower," "right," "left," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms, "a," "an" and "the," are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

1. A Displacement-Balancing Drivetrain

A well-known drivetrain is that of a classic two-wheel-drive automobile, where the actuator is in the form of an internal combustion engine with a single output shaft for driving two wheels; the transmission is in the form of a gearbox; and the two wheels serve as the end effectors. In comparison, a flapping-wing micro air vehicle with the PARITy drivetrain can use a piezoelectric bimorph (described below, and shown in FIGS. 34 and 35) as an actuator; a smart composite microstructure (SCM) (described, below, and shown in FIGS. 32 and 33) as a transmission; and a pair of wings (described, below, and shown in FIG. 10) as the end effectors, wherein the piezoelectric bimorph delivers power to the two wings through the smart composite microstructure.

Figure 2:
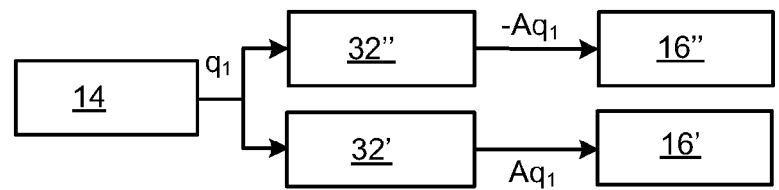
FIG. 2 is a representative block diagram of the HMF transmission of FIG. 1.

In these devices, the drivetrain, defined here as a mechanism including the actuator and the connecting transmission structure that delivers power to the end effectors, accomplishes the following two tasks: (1) it maps the actuation stroke to the end effector strokes, and (2) it distributes the available power amongst the two end effectors. The first task is accomplished by the transmission, which, in particular embodiments, can be in the form of a smart composite microstructure. A mechanically simple method for executing the second task, the apportionment of available power, is to constrain the relationship of end-effector displacements. This is the strategy used in the HMF; the HMF drivetrain, shown in FIGS. 1 and 2, flaps both wings on symmetric trajectories.

Balanced displacement of each end effector, however, is often not the ideal apportionment of actuator power. Specifically, in a flapping wing micro air vehicle, apportioning power so as to execute symmetric wing trajectories is not ideal because hovering in still air does not require balancing the trajectory of each wing. Rather, hovering requires balancing the aerodynamic reaction forces from each wing. With the eventual design intent of controlling the orientation and velocity of a micro air vehicle in free flight, the wing trajectories are of interest only as an instrument to create the desired aerodynamic forces. Other researchers are currently attacking the problem of balancing and controlling aerodynamic forces on the wings by introducing fully determined kinematic perturbations to wing stroke angles or to both stroke and attack angles, with the vision that a control system will calculate appropriate wing trajectories.

2. The PARITy Drivetrain

A. A Torque-Balancing Drivetrain

An alternative approach, however, is used by the PARITy drivetrain, wherein the mechanical PARITy drivetrain operates directly on aerodynamic forces and torques. The kinematics of the PARITy drivetrain are such as to be capable of producing complex relative wing motions. The PARITy drivetrain also responds correctly to asymmetric aerodynamic conditions presented to each wing, passively altering wing trajectories to produce the desired aerodynamic force and torque relationships without active control. Accordingly, the PARITy drivetrain, in contrast with the displacement-balancing HMF drivetrain, passively apportions actuator power so as to balance the aerodynamic drag torques realized at each wing, allowing wing stroke angles to decouple accordingly. This behavior is enabled by the introduction of a passive load balancing element that exploits system dynamics to balance load torques on the two wings.

In the existing context of a classic automobile drivetrain, a load-balancing element, known as the differential, is provided to deliver a balanced torque to two output shafts, allowing their rotations to decouple (and, thereby, also decouple the rotation of the wheels coupled with the shafts). In an automobile drivetrain incorporating a differential, the engine shaft rotation no longer determines the individual wheel rotations, rather, it prescribes the sum of the wheel rotations. The individual wheels are allowed to follow complex trajectories, but power from the engine will be distributed so as to balance the output torques.

Figure 3:
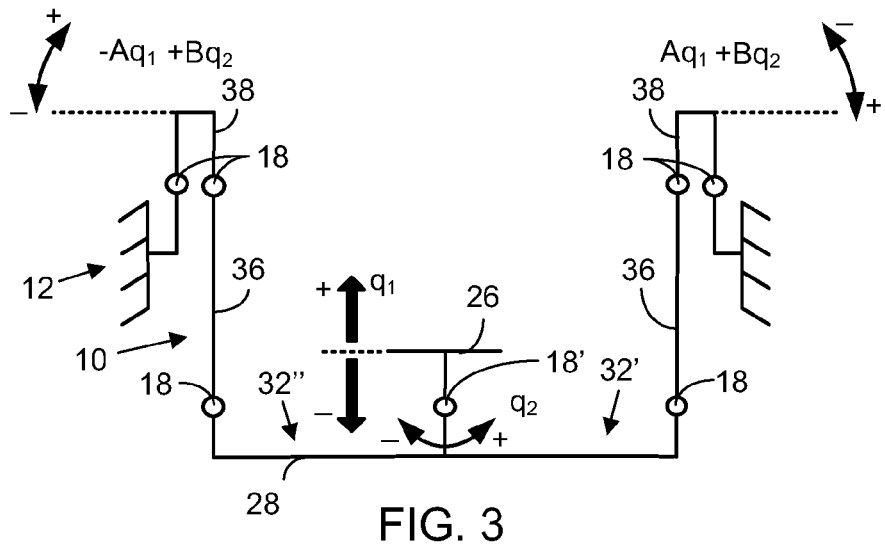
FIG. 3 is a kinematic diagram of an embodiment of the PARITy drivetrain.
Figure 4:
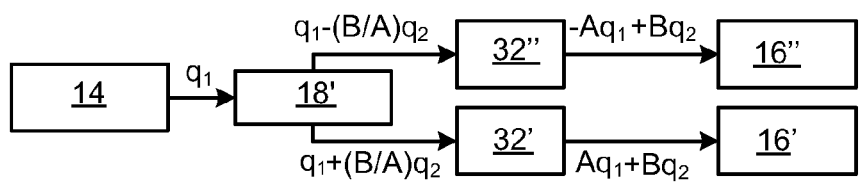
FIG. 4 a representative block diagram of the PARITy drivetrain of FIG. 3.
Figures 6, 7:
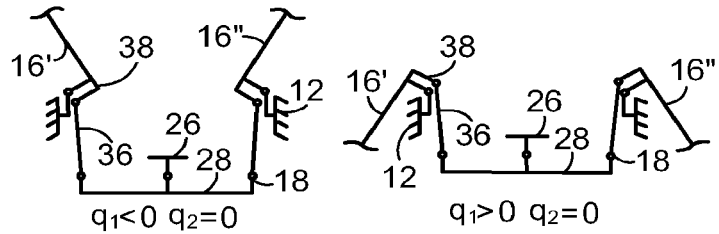
FIGS. 6-9 show representative block diagrams of the PARITy drivetrain with various angles and torques indicated.
Figures 8, 9:
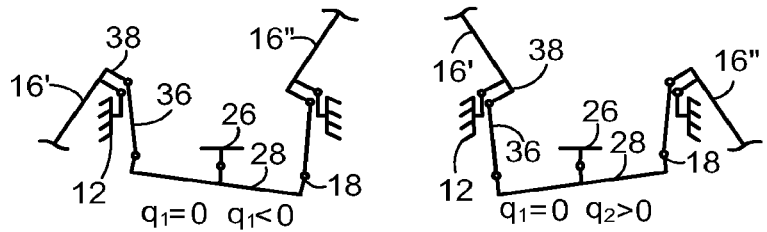

A kinematic diagram and a block diagram of an embodiment of the PARITy drivetrain that functions both as a transmission and as a load-balancing element in the context of a flapping wing micro air vehicle, are presented in FIGS. 3 and 4. Though both the PARITy and an automobile drivetrain deliver power from an actuation stroke (shown as q1 in FIGS. 3 and 4) to two output end-effectors, the kinematic design of the PARITy departs from that of an automobile drivetrain in the following ways.

1. The PARITy input and outputs are reciprocating motions. In an automobile drivetrain, the input and outputs are continuous rotations.
2. The actuation stroke, $q_1$, applied to the PARITy input prescribes the difference of output wing angles while their sum is undetermined. In an automobile, the sum of the output wheel rotations is prescribed while their difference is undetermined.
3. An automobile uses a single transmission upstream of the load balancing differential, while the PARITy is characterized by dual transmissions downstream of the load-balancing element.

Of these three differences, only the first difference has a large impact on the mechanism design. The second difference is purely semantic, arising from the chosen sign convention. The third has consequences on the detailed design of the system, but not on its overall function as both a load balancing element and a transmission.

The PARITy drivetrain apportions power from the single actuator in a manner that results in balanced instantaneous aerodynamic drag torques on each wing. One strategy for achieving this behavior with a drivetrain based on wing trajectory control includes the following three elements: a sensor to detect a drag torque imbalance, kinematic control inputs on the drivetrain to alter wing trajectories, and a control system to calculate the required wing trajectory corrections. The PARITy drivetrain includes these three elements, but all can be purely mechanical in nature. Torque imbalance on the wings is sensed using a mechanical "balance beam" structure. Additionally, a supplemental degree of freedom allows alteration of wing trajectories. Finally, the system dynamics can be tuned to behave as a control system, modulating wing stroke velocity to cancel the wing torques sensed by the balance beam. This complex dynamic behavior of the PARITy drivetrain can be achieved using a remarkably simple kinematic design.

B. Kinematics Description

Figure 5:
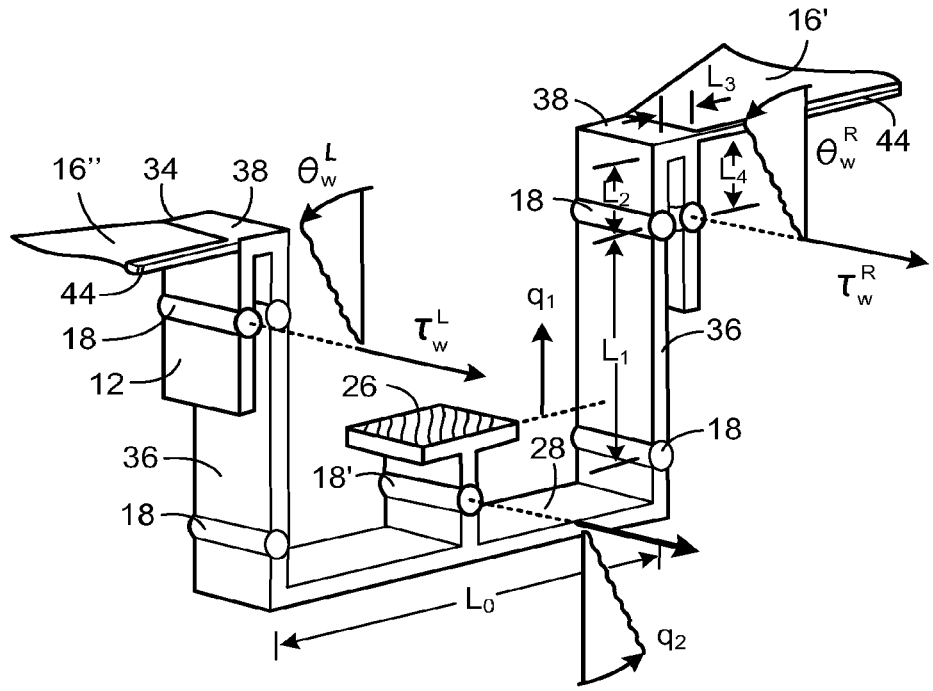
FIG. 5 shows a perspective view of an embodiment of the PARITy drivetrain.
Figure 32:
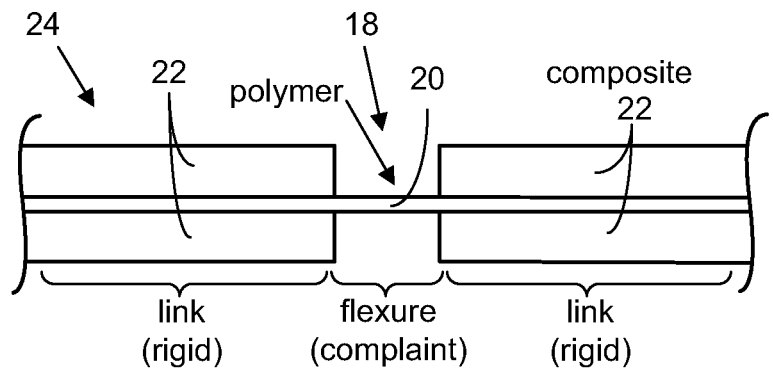
FIG. 32 shows the cross section of a typical flexure joint used in the PARITy drivetrain, wherein laser-micromachined carbon-fiber-reinforced-composite face sheets sandwich a thin layer of polyimide.
Figure 33:
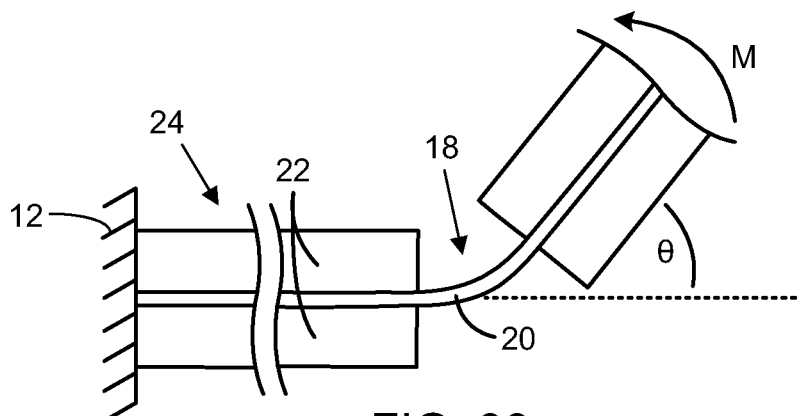
FIG. 33 shows compliance of the flexure joint of FIG. 20, where compliance is determined by the geometry and material properties such that a moment, M, results in an angular deflection, θ.

The PARITy drivetrain 10 of FIGS. 3 and 4 is a symmetric two-degrees-of-freedom planar mechanism constructed of rigid links connected by revolute joints (shown as cylinders or as circles in FIGS. 3 and 5). The revolute joints 18 can be approximately implemented in the form of flexures, as shown in FIGS. 32 and 33, where a flexible polymer strip 20 (formed, e.g., of a 7.6 µm-thick or 12.5 µm-thick polyimide sheet) that is significantly more flexible than the rigid links is intermittently sandwiched between rigid layer segments 22 (e.g., in the form of 80 µm-thick laser-machined unidirectional carbon-fiber-reinforced composite prepregs further comprising uncured adhesive) to form the rigid links 24 (in FIGS. 32 and 33) and 28, 36 and 38 (in FIGS. 3 and 5-9), and the structure will bend (approximating a pivot) at the gaps where the flexible polymer strip is exposed.

In one method for producing the structure (e.g., as shown in FIG. 3), a 80 µm-thick sheet of unidirectional carbon fiber prepreg is micro-machined by a pulsed laser. The polymer layer is likewise machined using this laser. The choice of polymer (e.g., polyimide) is based upon compatibility with the matrix resin in the carbon fiber. The cure cycle can reach a maximum temperature of 177° C. using a curing profile of four hours. Polyimide film (available, e.g., as KAPTON film from E.I. du Pont de Nemours and Company) has a sufficiently high service temperature (up to 400° C.) to survive the curing step.

Once cut, the polymer layer is aligned on the machined carbon-fiber composite layer. Due to the inert nature of polyimide, simple weights or clamps to put pressure on the two layers while curing is not sufficient to ensure adhesion. Accordingly, a vacuum-bagging process can be used, wherein a vacuum film is used in combination with a custom-machined aluminum plate to hold the vacuum during curing. Concurrently, a perforated Teflon sheet and a breather cloth can be used to prevent the resin's out-gassed bubbles from relieving pressure locally. This sufficiently places a uniform pressure on all areas of the sample.

Once cured, the polymer/carbon fiber is released and aligned onto another carbon fiber layer and cured using the same cycle again. The cut (gap) width between the rigid composite structures can be approximately 10 µm.

In an alternative fabrication technique, a multitude of thin (2.5 µm to about 150 µm thick) layers of various materials are laser micro-machined with desired features, usually cutting all the way through to create individual planar structures. A multitude of these layers (up to 15 has been demonstrated) are then aligned in a stack using dowel pins, similar to the alignment process used in circuit boards. Of course, more advanced alignment techniques can be used.

In the fifteen-layer example, the final layup included the following:
Linkage 1:
1) carbon
2) acrylic sheet adhesive
3) polyimide film
4) acrylic sheet adhesive
5) polyimide film
6) acrylic sheet adhesive
A lone carbon layer for spacing:
7) carbon
8) acrylic sheet adhesive
Linkage 2:
9) carbon
10) acrylic sheet adhesive
11) polyimide film
12) acrylic sheet adhesive
13) carbon
14) acrylic sheet adhesive
Wing Membrane
15) wing membrane (polyimide or polyester film)

The carbon layers in this embodiment can be standard cured carbon fiber sheets (e.g., with three layers of unideirectional fibers, wherein the fiber layers are oriented at 0°, 90°, and 0° to provide thickness in two orthogonal directions. Fifteen layers are used because the adhesive here is completely separate from each layer of structural material. Accordingly, the adhesive sheet can be laser machined into a pattern differing from any structural layer, and aligned layups of many layers can be made. This capability enables the fabrication of parts with many linkage layers that are perfectly aligned.

As in the above embodiment, every other layer in this layup can be a B-staged acrylic sheet adhesive (e.g., Dupont PYRALUX FR1500 acrylic sheets). Pressure and heat are then applied, typically in a heated platen press to crosslink the adhesive layers. The cured layup is then laser micro-machined a second time. Scrap materials are then removed to "release" functional components.

Released components often take the form of rigid links connected by flexure joints. These linkages can be "superplanar" structures, that is, a stack of planar linkages connected vertically at various points with "mechanical vias."

Press lamination and laser micro-machining can be conducted multiple times. For example, five layers can be laser micro-machined, then press laminated, then laser micro-machined again. Another three layers can be separately laser micro-machined, then press laminated, then laser micro-machined again. These two partial layups can then be press laminated together with a single adhesive layer between them, for a final layup of nine layers. This final layup can be laser micro-machined to release functional parts.

Pick and place operations can be used to insert discrete components into layups before press lamination. For example, insertion of PZT plates has been demonstrated to create functional bimorph cantilever actuators within a device. However, a broad range of discrete components can be inserted this way, such as potentially mirrors or other optical components, microelectromechanical systems (MEMS) devices, discrete sensors, etc.

Tack bonding is an optional process of lightly cross-linking an adhesive sheet to an adjacent layer before laser micromachining. The tack bonding allows for creation of an "island" of adhesive in a press layup that is not part of a contiguous piece, a significant increase in capability.

A detailed diagram of an embodiment of a drivetrain is presented in FIG. 5. The illustrated links 28, 36, and 38 are components of a larger mechanical ground frame, which is an airframe in a free-flying structure. The mechanism configuration is completely specified by the two configuration variables, $q_1$ and $q_2$. The vertical displacement of the central input platform 26 (oriented horizontally, as shown) is quantified by $q_1$. This platform 26, indicated by a hatched pattern in FIG. 5 receives the applied input power to the PARITy drivetrain and is herein referred to as the input platform 26. The input platform 26 is connected to a proximate link 28 through a fulcrum joint 18'; the rotation of the proximate link 28 about this joint is quantified by the second configuration variable, $q_2$. In this configuration, the proximate link 28 operates as a balance beam.

Figure 34:
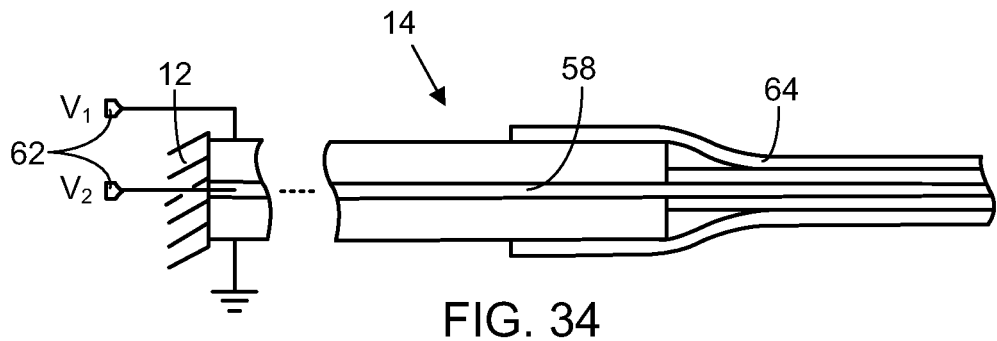
FIG. 34 shows the structure of a clamped free-bending cantilever that includes symmetric layers of lasermicromachined piezoceramic PbZrTiO$_3$ (PZT).
Figure 35:
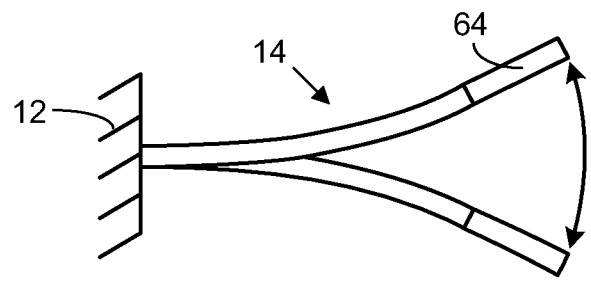
FIG. 35 shows bending of the cantilever drive actuator of FIG. 22 (shown exaggerated) as an electric field is applied to either PZT layer.

The input platform 26 is the attachment point for the output of the drive actuator 14 (in the form of a high-energy-density piezoelectric bimorph cantilever 54 in this embodiment), as shown in FIGS. 34 and 35. The cantilever can be fabricated via a smart-composite-microstructure fabrication technique, as described in R. Wood, "The First Takeoff of a Biologically Inspired At-Scale Robotic Insect," IEEE Transactions on Robotics, 24(2), 341 (2008). First, individual lamina [e.g., PbZrTiO$_3$ (PZT)-5H piezoelectric layers 56 and a M60J carbon fiber/cyanate ester resin prepreg layer 58] can be laser-micro-machined into desired link shapes. These layers 56 and 58 can then be stacked and aligned and put through a controlled cure cycle that regulates temperature, pressure, and time of cure. The resulting drive actuator 14 is fixed to the airframe 12 proximally and to the input platform 26 distally. At the end of the drive actuator 14 fixed to the input platform 26, a tip 64 of S-glass (high-strength glass fibers comprising a magnesium alumina silicate), e.g., in the form of a fabric, is secured. A voltage source 62 is also coupled with the drive actuator 14, wherein application of a voltage to either of the piezoelectric layers 56 will cause the actuator 14 to bend.

Figure 25:
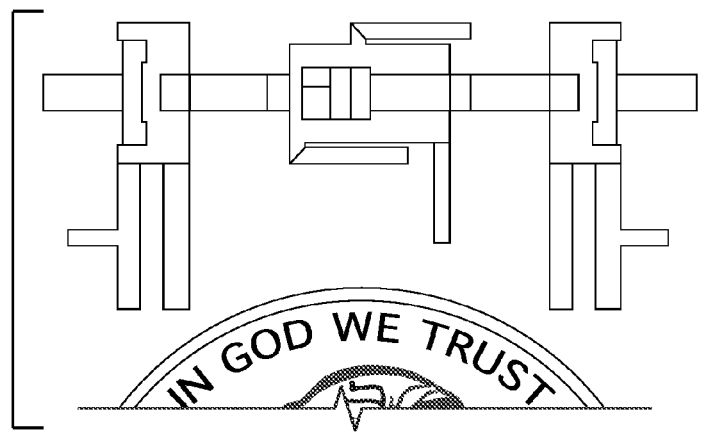
FIGS. 25 and 26 illustrates an embodiment of the PARITy drivetrain (a) before and (b) after folding.
Figure 26:
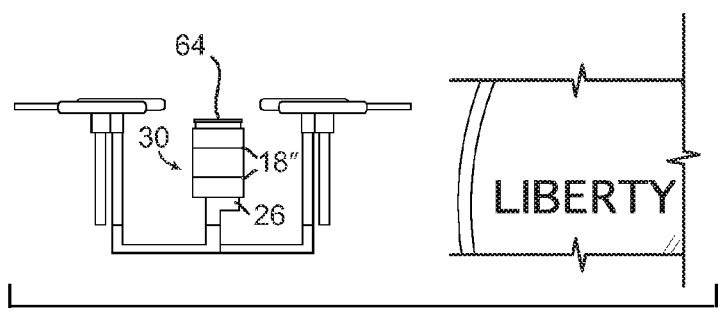

A coupling spacer 30 can be provided between the tip 64 of the cantilever 14 and the input platform 26 and secured to each. The coupling spacer 30 can include a pair of revolute joints 18" (see FIGS. 25 and 26, where the revolute joints 18" appear as lighter color lines) to accommodate the arched displacement of the cantilever 14. Application of an electric field via a voltage source 62 creates a bending moment in the drive actuator 14 that deflects the transmission. These drive actuators 14 are 40 mg, 12 mm long, and achieve a deflection of greater than ±400 µm with a bandwidth greater than 1 kHz. In various applications, the drive actuator is reciprocated with a sinusoidal displacement at a frequency of at least 40 Hz, and in particular applications at a frequency of at least 100 Hz.

Power is input in the PARITy drivetrain 10 by applying an oscillatory vertical force (through the coupling spacer 30) on the input platform 26, resulting in a reciprocating trajectory of $q_1$. The drivetrain 10 has two outputs 32 to drive the two wings, a right output 32' and a left output 32". The right output 32' of the drivetrain 10 terminates with link 38 on the right side of the drivetrain 10, while the left output 32" terminates with link 38 on the left side of the drivetrain. The configuration of the left wing 16" is described by a single stroke angle, $\theta_w^L(q_1,q_2)$, while the configuration of the right wing 16' is described by the angle, $\theta_w^R(q_1,q_2)$. Under the constraint, $q_2=0$, the resulting one-degree-of-freedom system may be similar to or the same as the HMF drivetrain, and oscillatory motion of $q_1$ produces a symmetric flapping motion of the wings characterized by $\theta_w^L=-\theta_w^R$.

The degree of freedom, $q_2$, at fulcrum joint 18' enables the balance beam link 28 to behave as a load balancing element in the PARITy drivetrain, altering how power is distributed from the single drive actuator 14 to each wing 16. Altering $q_2$ while holding $q_1$ constant results in a differential flapping motion coupling the upstroke of one wing with the downstroke of the other. This degree of freedom has no associated actuator; rather, its trajectory during operation of the PARITy drivetrain is entirely determined by the system dynamics.

As a function of the system configuration variables, $q_1$ and $q_2$, exact expressions for the left and right wing stroke angles are exceedingly complex, as evidenced by the following equation:

$$\theta_w^R(q_1, q_2) = a\tan\left(\frac{L_4 - L_2}{L_3}\right) + \left(\frac{L_1 + L_2 - L_4 - \frac{1}{2}L_0\sin q_2 - q_1}{L_3 + \frac{1}{2}L_0(1-\cos q_2)}\right) - \tag{1}$$

$$a\cos\frac{\left(L_3 + \frac{1}{2}L_0(1-\cos q_2)\right)^2 + \left(L_1+L_2-L_4-\frac{1}{2}L_0\sin q_2-q_1\right)^2 + (L_4-L_2)^2 + L_3^2 - L_1^2}{2\sqrt{\left(L_3+\frac{1}{2}L_0(1-\cos q_2)\right)^2 + \left(L_1+L_2-L_4-\frac{1}{2}L_0\sin q_2-q_1\right)^2}\left((L_4-L_2)^2+L_3^2\right)}$$

but are related by a simple expression:

$$\theta_w^R(q_1,q_2)=-\theta_w^L(q_1,-q_2) \tag{2}$$

For design insight, a first-order linearization of Equation (1) around the neutral point results in the following approximate expressions:

$$\theta_w^R(q_1, q_2) \approx -\frac{1}{L_3}\left(\frac{1}{2}L_0 q_2 + q_1\right) \tag{3}$$

$$\theta_w^L(q_1, q_2) \approx -\frac{1}{L_3}\left(\frac{1}{2}L_0 q_2 - q_1\right)$$

Displacement transmission ratios, $T^R$ and $T^L$, relating infinitesimal balance beam rotations to changes in wing angles can be defined as follows for the PARITy drivetrain:

$$T^R(q_1, q_2) \equiv \frac{\partial \theta_w^R}{\partial q_2}(q_1, q_2) \tag{4}$$

$$T^L(q_1, q_2) \equiv \frac{\partial \theta_w^L}{\partial q_2}(q_1, q_2)$$

Combining Equation (4) with Equations (1) and (2) results in closed-form analytical expressions for $T^R(q_1,q_2)$ and $T^L(q_1,q_2)$, though the details of this derivation have been omitted for brevity. See FIG. 11 for a plot of $T^R(q_1,q_2)$ as a function of the wing angle, $\theta_w^R(q_1,q_2)$ for the experimentally constructed PARITy drivetrain.

Displacement transmission ratios are useful for calculating wing stroke angles, though the PARITy drivetrain fundamentally operates on wing torques as opposed to wing angles. An understanding of how the kinematic structure transmits torques facilitates an understanding of the system dynamics. Consider a torque, $\tau_w^R$, applied to the right wing (see FIG. 5). The functions, $T^R(q_1,q_2)$ and $T^L(q_1,q_2)$, also serve as torque transmission ratios, with $T^R(q_1,q_2)$ describing how the torque, $\tau_w^R$, is transmitted by the kinematic structure to appear as a torque, $\tau_b$, on the balance beam link 28 about the fulcrum joint 18':

$$\tau_b = T^R(q_1,q_2)\tau_w^R \quad (5)$$

At the neutral configuration, $q_1=q_2=0$, the torque transmission ratios take on the following value, defined to be the constant, T:

$$T^R(0,0) = T^L(0,0) = -\frac{L_0}{2L_3} \equiv T \quad (6)$$

A constant approximation, $T^R(q_1,q_2) \approx T^L(q_1,q_2) \approx T$, will be used for the torque-transmission ratios to simplify the theoretical analysis, though the simulation model described in the dynamics simulation section, below, uses the full analytical expression, plotted in FIG. 11. For the specific incarnation of the PARITy design simulated, fabricated, and tested here, the dimensionless constant, T, was equal to −6.25.

Using the constant approximation, T, for the torque-transmission ratios and including an applied torque, $\tau_w^L$, on the left wing results in the following expression for the total torque transmitted to the balance beam, $\tau_b$, from both wings:

$$\tau_b = T\tau_w^L + T\tau_w^R \quad (7)$$

This torque-transmission property of the PARITy transmission will be central to the discussion of its load-balancing dynamics, described in the simplified dynamics analysis section, below.

Figure 10:
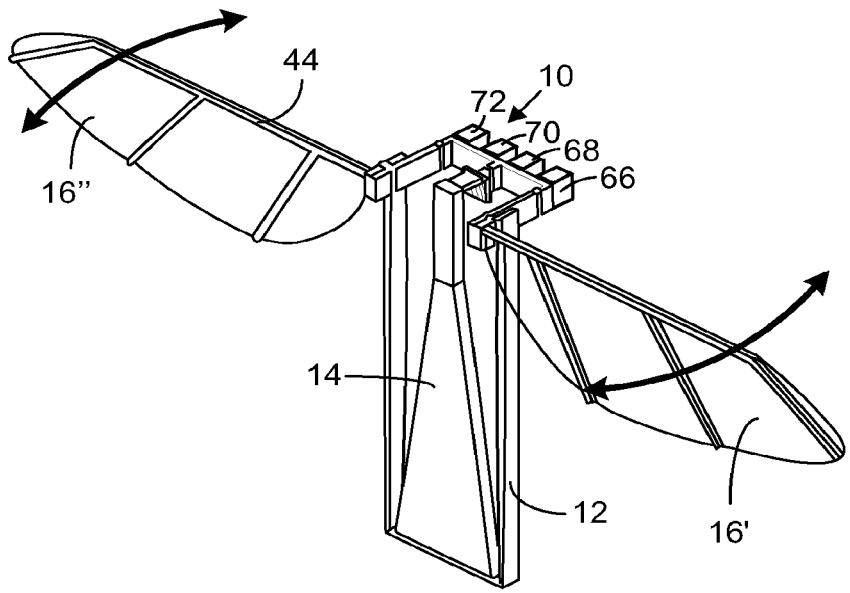
FIG. 10 shows an airborne micro-robotic device, wherein wings are affixed to a PARITy drivetrain.

The two wings 16 (16' and 16") are affixed to the outputs of the PARITy drivetrain in the manner illustrated in FIG. 10. Vertical aerodynamic forces constitute lift, while drag forces are perpendicular to the wing 16. For this experiment, the wings 16 remain perpendicular to their direction of motion, implying a fixed angle of attack, α, of 90°. The wings 16, in this embodiment, produce an aerodynamic lift force to counteract gravity. Contrary to the convention for fixed-wing aircraft, lift is defined as the component of aerodynamic forces oriented vertically in FIG. 10, similar to a rotorcraft convention. An established technique for generating lift in a flapping-wing micro air vehicle is to allow each wing to change its angle of attack, α. This motion is readily observed in biological flying insects and can be actively controlled in a micro-robotic insect. Alternatively, passive rotation has been demonstrated to generate enough lift to support the weight of a complete aeromechanical system. Though the PARITy design is expected to accommodate lift generation with an actively or passively modulated angle of attack, a fixed angle of attack, α=90°, has been used to simplify the analysis of its behavior.

Given only the drive actuator trajectory, $q_1(t)$, the wing trajectories described by $\theta_w^L(t)$ and $\theta_w^R(t)$ cannot be kinematically determined due to the passive degree of freedom, $q_2$. An analysis of the system dynamics is used to determine the realized wing trajectories as well as to evaluate the performance of the PARITy drivetrain. It will be shown that under certain operating conditions, $q_2$ dynamically follows a trajectory that balances the aerodynamic drag torques experienced by the wings.

C. Simplified Dynamics Analysis (i) Torques from Flapping Wings

In the following discussion, it will be assumed that an actuation force is applied such that $q_1(t)$ undertakes a sinusoidal trajectory in time. This assumption reduces the system to one in which the rotation, $q_2$, of the balance beam link 28 about the fulcrum joint 18' is the single degree of freedom. This simplification is illustrative in that it isolates the load balancing differential component in the PARITy design. The flapping motion of the wings causes them to exert torques, $\tau_w^L$ and $\tau_w^R$, at the outputs of the PARITy drivetrain.

These wing torques, $\tau_w^L$ and $\tau_w^R$, arise from two distinct sources:

1. $\tau_{w,inertial}$: the Newtonian reaction torque resisting wing acceleration, and
2. $\tau_{w,drag}$: the torque resulting from the aerodynamic drag forces exerted by the ambient fluid on the wing.

The total torques, $\tau_w^L$ and $\tau_w^R$, exerted by the wings on the drivetrain outputs can be represented as the sum of contributions from these two sources:

$$\tau_w^L = \tau_{w,drag}^L + \tau_{w,inertial}^L$$

$$\tau_w^R = \tau_{w,drag}^R + \tau_{w,inertial}^R \quad (8)$$

The inertial reaction torque, $\tau_{w,inertial}^R$, of a wing is straightforward to quantify. The following is an expression for the inertial torque due to the right wing:

$$\tau_{w,internal}^R = I^R \ddot{\theta}_w^R \quad (9)$$

In the preceding equation, the quantity, $I^R$, is the total moment of inertia of the right wing about its wing pivot.

Aerodynamic drag torques result from a variety of fluid effects, some of which depend not just on the instantaneous state of the system, but on its time history, as well. For this analysis, a simplified expression produced by a blade-element model will be used to model the aerodynamic drag torque.

First, the drag parameter, $\Omega^R$, of the right wing is defined as follows:

$$\Omega^R \equiv \tfrac{1}{2}\rho \int r^3 c^R(r)dr \quad (10)$$

In the preceding expression, ρ is the fluid density, $c^R(r)$ is the chordwise dimension of the right wing at a distance, r, from the non-fully actuated wing pivot 34, and the limits of the integral are chosen to cover the entire wing extent. The aerodynamic behavior of the left and right wings is captured by their associated drag parameters, $\Omega^L$ and $\Omega^R$ (see Table 1, below, for experimental values).

TABLE 1

| Drivetrain | Trial | $\Omega^R$ (mg·mm²) | $\Omega^L$ (mg·mm²) | $\Delta\tau_{w,drag}$ (mN·mm) | $\tau_{w,drag}^R$ (mN·mm) | $\tau_{w,drag}^L$ (mN·mm) | Drag Torque Imbalance instantaneous | peak |
|---|---|---|---|---|---|---|---|---|
| HMF | Control | 31.3 | 31.3 | 0.00 | 12.42 | 12.42 | 0.0% | 0.0% |
|  | 1-Cut | 31.3 | 18.8 | 5.52 | 13.78 | 8.26 | 40.1% | 40.1% |
|  | 2-Cut | 31.3 | 13.2 | 8.32 | 14.35 | 6.03 | 58.0% | 58.0% |

TABLE 1-continued

| Drivetrain | Trial | $\Omega^R$ (mg·mm²) | $\Omega^L$ (mg·mm²) | $\Delta\tau_{w,drag}$ (mN·mm) | $\tau_{w,drag}^R$ (mN·mm) | $\tau_{w,drag}^L$ (mN·mm) | Drag Torque Imbalance | |
|---|---|---|---|---|---|---|---|---|
| | | | | | | | instantaneous | peak |
| PARITy | Control | 31.3 | 31.3 | 0.03 | 12.46 | 12.47 | 0.2% | 0.1% |
| | 1-Cut | 31.3 | 18.8 | 0.97 | 10.73 | 10.77 | 9.0% | 0.3% |
| | 2-Cut | 31.3 | 13.2 | 1.46 | 9.56 | 9.46 | 15.03% | 1.0% |

In Table 1, above, the torque measurements represent peak magnitude over wingstroke.

The blade-element model produces the following expression for the drag torque applied by the right wing, assuming no external fluid flow:

$$\tau_{w,drag}^R = -\Omega^R C_D(\alpha) sgn\dot{\theta}_w^R (\dot{\theta}_w^R)^2 \qquad (11)$$

The quantity, $C_D$, is the characteristic drag coefficient of the wing and is a function of the angle of attack, $\alpha$. The drag coefficient is estimated according to the following relationship between the drag coefficient and angle of attack, derived experimentally from force measurements on dynamically scaled wings flapping in mineral oil:

$$C_D(\alpha) = 1.92 - 1.55 \cos(2.04\alpha - 9.82°) \qquad (12)$$

The fixed angle of attack, $\alpha=90°$, representative of this analysis (see FIG. 10) results in a drag coefficient, $C_D=3.46$.

(ii) Mechanical Torque Feedback

The torques, $\tau_w^L$ and $\tau_w^R$, calculated from Equations (9) and (11), act on the balance beam link 28 about the fulcrum joint 18' due to the kinematic torque transmission mechanism. Since the mass of the balance beam link 28, itself, is negligible, this torque, $\tau_b$, is effectively zero; so from Equation (7), the following relationship holds:

$$\tau_w^L = -\tau_w^R \qquad (13)$$

This equation represents the equilibrium condition of the PARITy drivetrain and is fundamental to its operation. Simply put, a system operating at this equilibrium point will deliver torques of equal magnitude to each wing 16 about its respective wing pivot 34. Recall, however, that these wing torques arise from both inertial and aerodynamic sources. If the inertial torques are small compared to the aerodynamic drag torques, then a PARITy drivetrain operating in this equilibrium will flap the wings 16 in a manner that balances the aerodynamic drag torques experienced by the wings 16.

Figure 12:
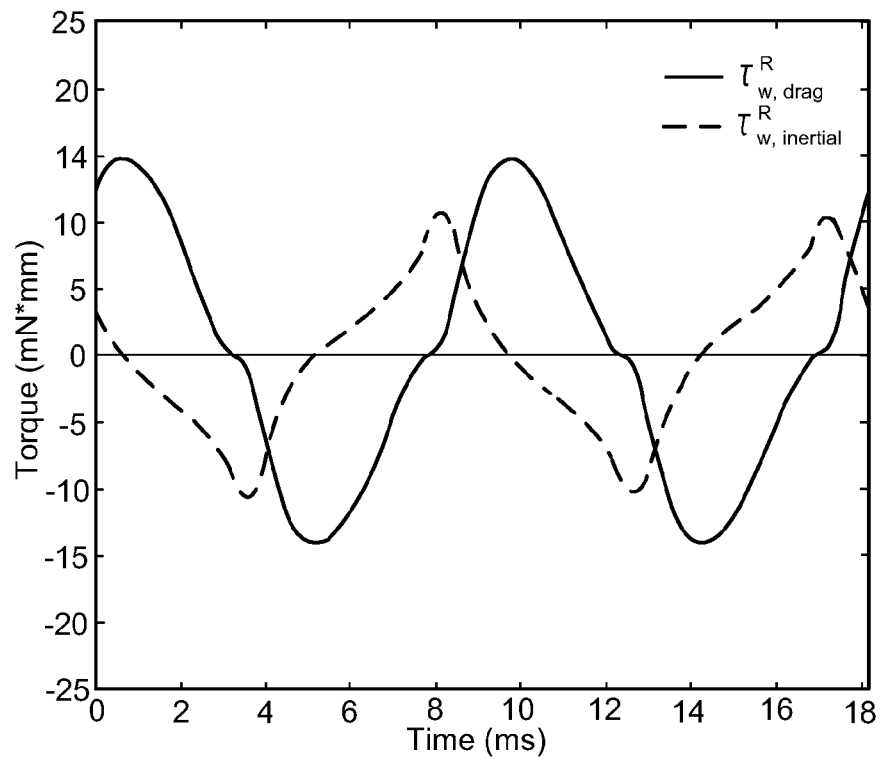
FIG. 12 plots theoretical torques, $\tau_{w,drag}^R$ and $\tau_{w,inertial}^R$ applied by the right wing in a symmetric system, wherein $|\tau_{w,drag}^R| > |\tau_{w,inertial}^R|$ over the following approximate time intervals: 0-2.3 ms, 4-7 ms, 8.6-11.4 ms, 13.2-16 ms, and 17.8-18.2 ms.

Inertial torques are largest at the extremes of the wingstroke where the angular wing acceleration is maximal. Ignoring complex and unmodeled effects at stroke reversal, drag torques tend to be largest when the wing 16 is mid-stroke near its maximum angular velocity. This phase dependence of the inertial and drag torques is apparent in FIG. 12.

Should inertial torques dominate, from Equation (9) it can be shown that the balance beam link 28 experiences a restoring torque if $\ddot{\theta}_w^L$ and $\ddot{\theta}_w^R$ are perturbed from equilibrium, implying a feedback loop sensitive to errors in $\dot{q}_2$. Should aerodynamic torques dominate, the aerodynamic model used in this study also results in a negative feedback loop; however, the aerodynamically dominated system responds to wing velocity as opposed to acceleration and is sensitive to errors in $\dot{q}_2$. The situation is more complex when inertial torques are of comparable magnitude to aerodynamic torques, but resorting to the full dynamics simulation, discussed below, results in no apparent stability problems.

The drag torque feedback loop is sensitive to $\dot{q}_2$, and the inertial torque feedback loop is sensitive to $\ddot{q}_2$, but neither is sensitive to the balance beam angle, $q_2$. Though these two feedback loops are dominant on a sub-wingstroke timescale, neither will correct for a gradual drift of $q_2$ occurring over a timescale encompassing many wingstrokes. Such a drift would affect the midpoint angles of each wingstroke, which, if allowed to drift over a large range, may adversely affect the performance of the system.

To address this issue, we revisit Equation (7). This equation for the torque, $\tau_b$, on the balance beam has neglected an internal torque contribution. In a physical incarnation of the PARITy drivetrain (see the experimental verification section, below), revolute joints are achieved using polymer flexures that act as torsion springs, as shown in FIGS. 32 and 33. This spring torque, $\tau_k$, always acts to restore the balance beam to horizontal ($q_2 \to 0$), but the magnitude of this torque can be made to be negligible compared to the typical magnitudes of $T\tau_w^L$ and $T\tau_w^R$ for sub-wingstroke dynamics. Augmenting Equation (7) to incorporate the spring torque results in the following expression for the torque, $\tau_b$, on the balance beam:

$$\tau_b = T\tau_w^L + T\tau_w^R + \tau_k \qquad (14)$$

Though $\tau_k$ is negligible on the sub-wingstroke timescale, $\tau_k$ is the only torque that responds to a slowly drifting value of $q_2$. If the trajectory of $q_2$ is offset from zero, $\tau_k$ biases the system in a way that tends to correct it. The torsional spring constants can be set such that $\tau_k$ provides ample resistance to a drifting balance beam angle without substantially impacting wingstroke dynamics.

For simplicity, this discussion of the PARITy drivetrain dynamics has used a linear approximation of mechanism kinematics. To confirm, however, that the full nonlinear system indeed exhibits the torque balancing characteristics implied by this linearized analysis, a numerical simulation of the full nonlinear system dynamics was developed.

3. Dynamics Simulation

A. Simulation Characteristics

A pseudo rigid body model is an excellent approximation for an insect-scale PARITy drivetrain realizable with the smart composite microstructure (SCM) fabrication techniques, producing the structure shown in FIGS. 32 and 33. Using this model, links are assumed to be infinitely stiff while the joints are modeled as perfect revolute joints in parallel with torsion springs. The associated spring constants are derived from standard beam theory, as described in R. Wood, "The First Takeoff of a Biologically Inspired At-Scale Robotic Insect," 24 IEEE Trans. Rob. 341-47 (2008).

The piezoelectric bimorph actuator 54, as described in the immediately above-cited reference and shown in FIGS. 34 and 35, is modeled as a linear spring in parallel with a time-varying force. Both the spring constant and the force amplitude were calculated from known dimensions and material properties using a laminate plate theory model, as described in R. Wood, et al., "Optimal Energy Density Piezoelectric Bending Actuators," 119 Sensors & Actuators: A. Physical 476-488 (2005).

The only modeled inertias are those of the two wings, dominating the negligible and unmodeled mass of the PAR- ITy drivetrain mechanism, itself. Though actuator mass is nominally large, due to the large transmission ratio coupling the actuation stroke to the wing stroke, the effective actuator mass is negligible and its impact has not been modeled.

Aerodynamic drag torque on the wing is modeled according to Equation (11). The full non-linear torque transmission ratios, $T^R(q_1,q_2)$ and $T^L(q_1,q_2)$, are incorporated into the simulation code.

The two configuration variables, $q_1$ and $q_2$, along with their time derivatives, $\dot{q}_1$ and $\dot{q}_2$, completely specify the state of the system. An Euler-Lagrange formulation produces a set of two coupled second-order nonlinear differential equations for $q_1(t)$ and $q_2(t)$. The aerodynamic drag torques on each wing enter the simulation model as generalized forces, while a third generalized force is the time-varying force exerted by the drive actuator.

These differential equations have been integrated numerically in MATLAB (from The Mathworks of Natick, Mass.) using the Runge-Kutta based routine, ode45. In all simulations described in this article, the actuator force is varied sinusoidally in time with zero mean, a peak to peak amplitude of 242.5 mN (predicted from a 200V drive signal), and a frequency of 110 Hz. The drive frequency is tuned to the observed mechanical resonance of the realized experimental structure, described in the experimental verification section, below.

B. Performance

A primary benefit of the PARITy drivetrain in this context is its ability to passively compensate for asymmetric aerodynamic conditions. These can arise from factors external to the microrobotic insect, such as wind gusts or thermal variations; or they can arise from internal factors, such as asymmetries due to fabrication variation or degradation during operation. Asymmetry of the wing membranes, accurately achievable in a laboratory setting, was used to assess the performance of the PARITy in comparison to the baseline HMF drivetrain which exhibits no load balancing characteristics. A "control" simulation of the two drivetrains was conducted with symmetric wing parameters. Since $\Omega_{Control}^L=\Omega^R$, both the HMF and the PARITy drivetrains produce balanced aerodynamic drag torques on each wing in the control trial.

Figure 13:
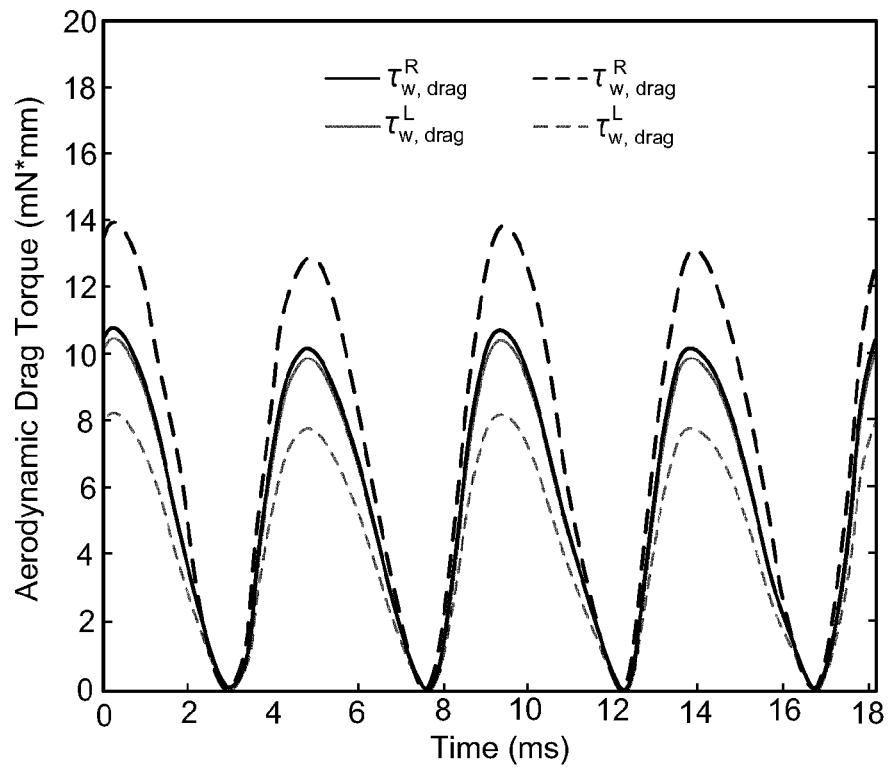
FIG. 13 plots simulated drag torques, where the right wing has a drag parameter $\Omega^R=31.3$ mg·mm$^2$, and the left wing drag parameter, $\Omega^L$, has been reduced to $0.599 \cdot \Omega^R$.
Figure 14:
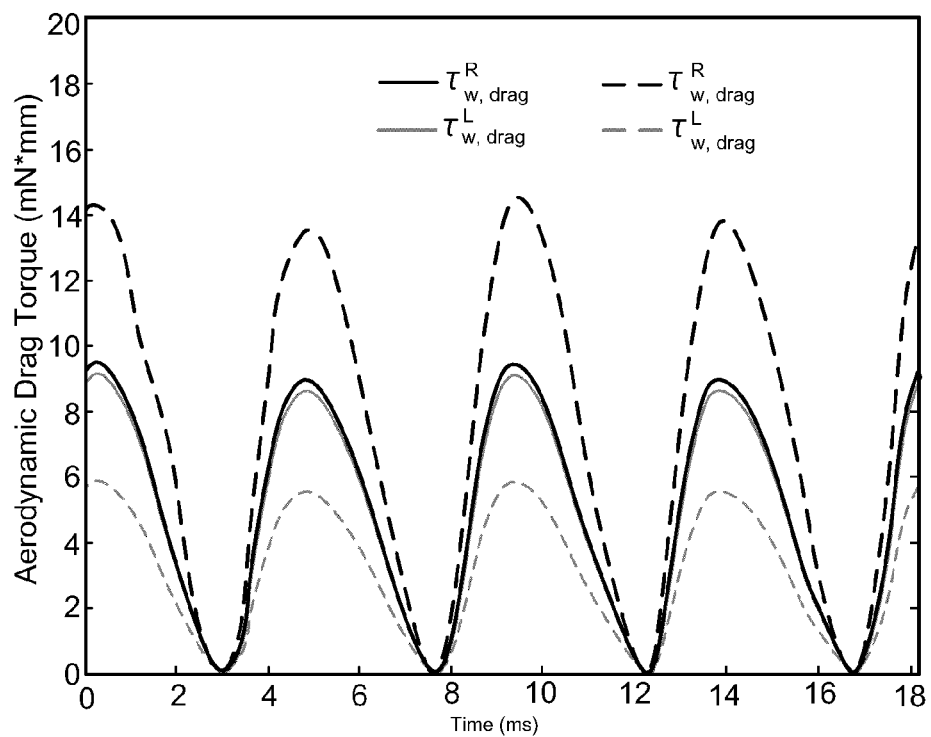
FIG. 14 plots simulated drag torques, where the right wing has a drag parameter $\Omega^R=31.3$ mg·mm$^2$, and the left wing drag parameter, $\Omega^L$, has been reduced to $0.420 \cdot \Omega^R$.

Removing a section of the wing membrane effectively reduces the area of the wing planform. If the left wing is altered in this manner, its drag parameter, $\Omega^L$, will be smaller than $\Omega^R$ of the unaltered right wing. The HMF drivetrain will always produce symmetric trajectories for the wings, meaning that their angular velocities are constrained to be equal and opposite. If membrane removal from the left wing results in its drag parameter being 59.9% of the drag parameter of the right wing, we expect from Equation (11) that use of the HMF drivetrain will result in the drag torque experienced by the left wing to be 59.9% of that experienced by the right wing at every point in time. The condition $\Omega_{1\text{-}Cut}^L=0.599\cdot\Omega^R$ will be called the "one-cut" trial, and the drag torques experienced by each wing using the HMF drivetrain is illustrated in FIG. 13. The results of a second trial, the "two-cut" trial, in which the left wing's drag parameter has been reduced to 42.0% of that of the right wing ($\Omega_{2\text{-}Cut}^L=0.420\cdot\Omega^R$) are shown in FIG. 14. The system parameters for these two trials are chosen to correspond with that realized by the experimental procedure, in the experimental verification section, below In contrast with the HMF drivetrain, the PARITy drivetrain does not constrain the wing stroke angles to have symmetric trajectories. The load balancing characteristics of the transmission act to match the aerodynamic drag torques even in the presence of drastically asymmetric drag parameters. FIGS. 13 and 14 illustrate that with the use of the PARITy drivetrain, the aerodynamic drag torques experienced by both the left and right wings have been passively balanced by the system dynamics.

To quantitatively evaluate the simulated performance of the PARITy drivetrain relative to the baseline HMF drivetrain, the following metrics have been defined and are relevant once periodic operation has been established. The first is the peak drag torque imbalance, defined as the difference between the maximum drag torque magnitudes experienced by each wing over a cycle. The second is the instantaneous drag torque imbalance, defined to be the maximum value of the torque discrepancy, $\Delta\tau_{w,drag}$, over a cycle. Both metrics are normalized to the maximum drag torque experienced by the right wing over a cycle. The drag torque discrepancy, $\Delta\tau_{w,drag}$, is defined as follows:

$$\Delta\tau_{w,drag}=\tau_{w,drag}^L+\tau_{w,drag}^R \quad (15)$$

Note that when the drag torques on the wings are balanced, $\Delta\tau_{w,drag}=0$. Table 1, above, summarizes the performance of the HMF and PARITy drivetrains in the control, one-cut, and two-cut trials.

The peak drag torque imbalance metric compares the amplitudes of the drag torques while ignoring their phase relationship. In the one-cut trial, the HMF drivetrain exhibits a peak drag torque imbalance of 40.1%, which is expected due to $\Omega_{1\text{-}Cut}^L=0.599\cdot\Omega^R$. Use of the PARITy, however, reduces this peak drag torque imbalance to 0.3%. In the two-cut trial, the peak torque imbalance of 58% exhibited by the HMF drivetrain is reduced to 1.0% with use of the PARITy drivetrain. Performing remarkably well, the PARITy drivetrain reduces the peak drag torque imbalance by a factor of 133 in the one-cut trial and a factor of 58 in the two-cut trial. The instantaneous drag torque imbalance metric reports the maximum drag torque discrepancy, $\Delta\tau_{w,drag}$, experienced during a wingstroke, relative to the peak drag torque magnitude of the unaltered wing. For the one-cut trial, an instantaneous drag torque imbalance of 40.1% exhibited by the HMF drivetrain is reduced to 9.0% by the PARITy drivetrain. For the two-cut trial, the HMF drivetrain's instantaneous drag torque imbalance of 58% is reduced to 15.3% by the PARITy drivetrain. Though the PARITy drivetrain still performs well, a slight phase shift between the drag torques on each wing impacts its performance under the instantaneous drag torque metric. The drag torque discrepancy, $\Delta\tau_{w,drag}$, is plotted over a single wingstroke in FIGS. 15-17.

Figure 15:
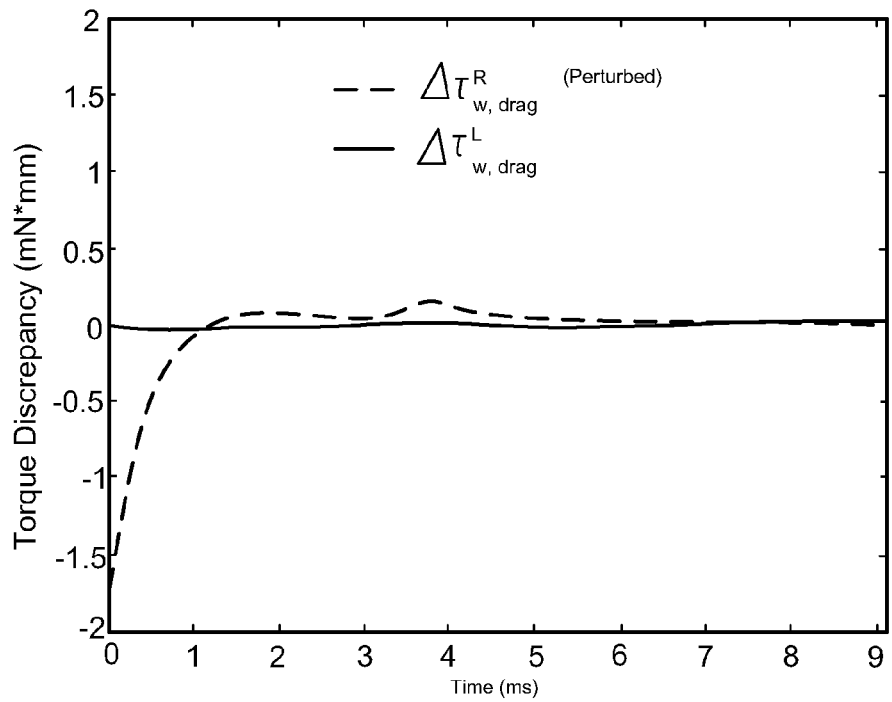
FIG. 15 plots, as a solid line, the drag torque discrepancy, $\Delta\tau_{w,drag}$, between wings over a single wingstroke when $\Omega_{Control}^L = \Omega^R$, wherein the dashed line describes the recovery of the torque imbalance from a 2-radian-per-second perturbation applied to the balance beam rotational velocity, $\dot{q}_2$, at time, t=0.
Figure 16:
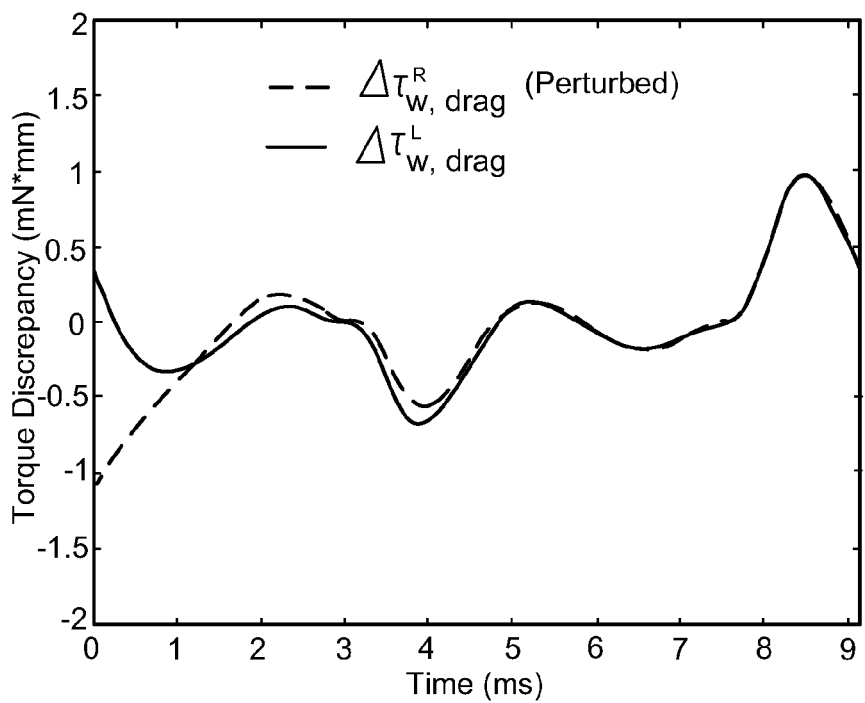
FIG. 16 plots, as a solid line, the drag torque discrepancy, $\Delta\tau_{w,drag}$, between wings over a single wingstroke when $\Omega_{1-Cut}^L = 0.599 \cdot \Omega^R$, wherein the dashed line describes the recovery of the torque imbalance from a 2-radian-per-second perturbation applied to the balance beam rotational velocity, $\dot{q}_2$, at time, t=0.
Figure 17:
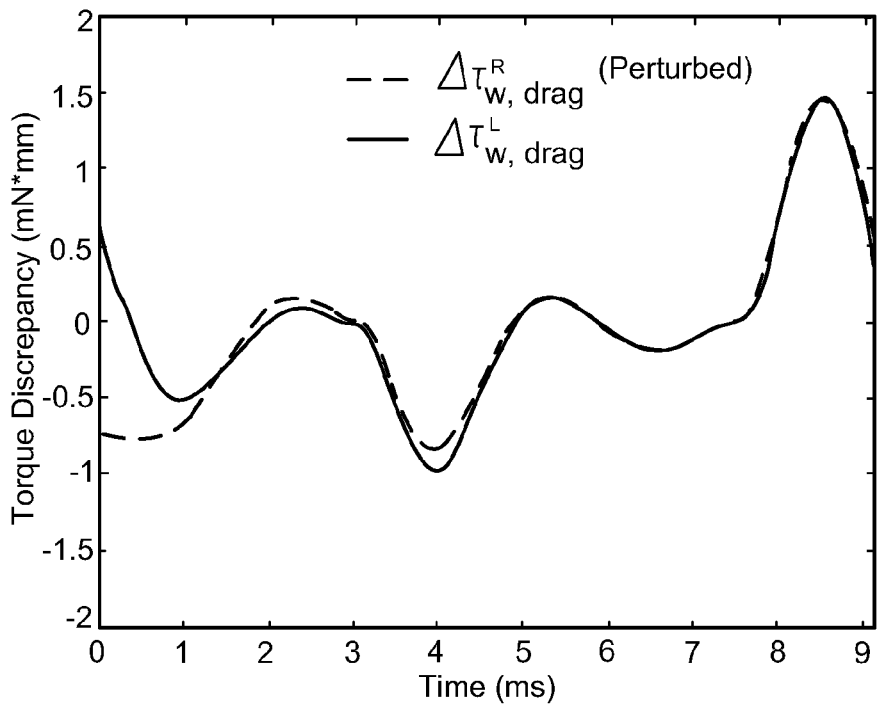
FIG. 17 plots, as a solid line, the drag torque discrepancy, $\Delta\tau_{w,drag}$, between wings over a single wingstroke when $\Omega_{2-Cut}^L = 0.420 \cdot \Omega^R$, wherein the dashed line describes the recovery of the torque imbalance from a 2-radian-per-second perturbation applied to the balance beam rotational velocity, $\dot{q}_2$, at time, t=0.

In order to investigate the damping properties and time response of the torque balancing feedback loops, a perturbation was applied to the system in the form of a step change in $\dot{q}_2$ of 2 radians per second. This perturbation roughly corresponds to a 0.36 mN·mm·ms angular impulse applied to both wings. The impulse upsets the normal operation of the PARITy drivetrain, and the dashed lines in FIGS. 15-17 illustrate the recovery of $\Delta\tau_{w,drag}$. The drivetrain returns smoothly to periodic operation, regaining much of its steady state character with a time constant on the order of 1 ms. For all trials, the perturbed performance is indistinguishable from that of the unperturbed system in less than one wingstroke (9.1 ms).

4. Experimental Verification

A. Methods

In order to experimentally verify the theoretical performance of the PARITy drivetrain design, an at-scale PARITy was fabricated using SCM fabrication techniques. The drivetrain is a symmetric structure with links 28, 36 and 38, as referenced in FIG. 5, of the following lengths (with orthogonal branches of link 38 designated "inner," "top" and "outer" as positioned in the illustrated configuration):

| link 28 | link 36 | inner branch of link 38 | top branch of link 38 | outer branch of link 38 |
|---|---|---|---|---|
| 5000 μm | 2500 μm | 800 μm | 400 μm | 800 μm |

These values produce a PARITy drivetrain that maps a ±200 μm actuation stroke into an approximately ±35° wing stroke. This wing stroke is smaller than the wingstroke amplitude that was used to demonstrate a lift force greater than the aeromechanical system mass in R. Wood, "The First Takeoff of a Biologically Inspired At-Scale Robotic Insect," 24 IEEE Trans. Rob. 341-47 (2008). However, reducing wing membrane area is expected to increase wing amplitude, and a conservative baseline stroke amplitude is provided to accommodate the extreme removal of the wing membrane tested in the two-cut trial.

Figures 18, 19, 20, 21, 22, 23:
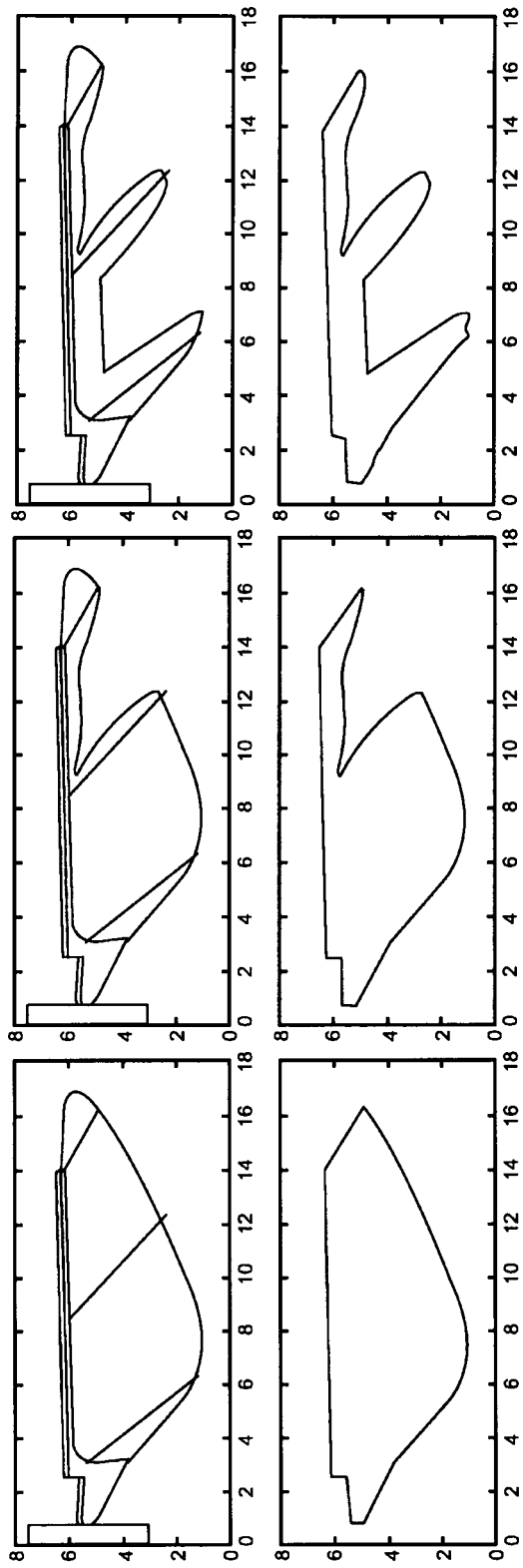
FIGS. 18-23 provide images of the left wing membrane used for each trial along with the associated planforms used to calculate the drag parameter, $\Omega^L$, using the blade element model (units are in millimeters)
Figure 24:
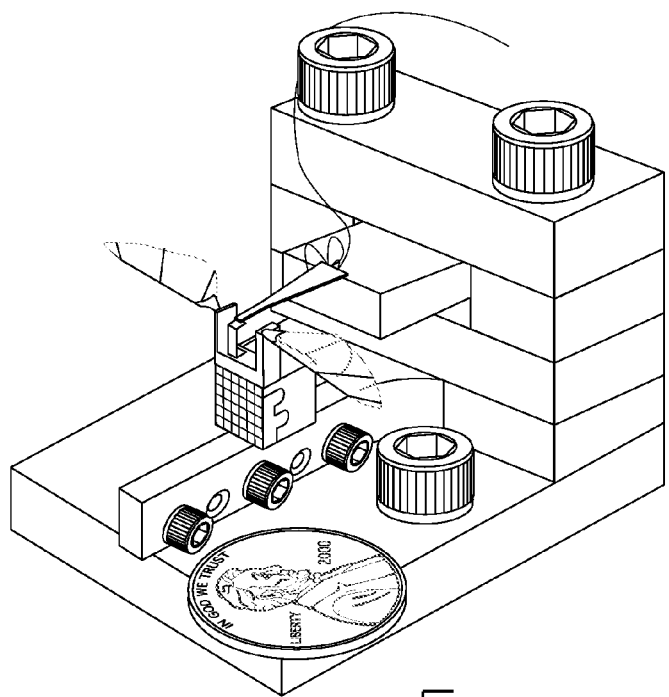
FIG. 24 illustrates an experimental test structure for a device.

The transmission and drive actuator were mounted into a high-stiffness test structure (FIG. 24) forming a nearly ideal mechanical ground. Two wings identical to within manufacturing tolerances were fabricated using spars 44 formed of structural carbon fiber and a 1.5 μm-thick polyester wing membrane. As fabricated, these wings, shown in FIGS. 18-23, have a mass of 834 μm and a moment of inertia around the wing pivot equal to 29.0 mg·mm². The wings extend 16.0 mm beyond the wing pivot, with an effective planform area of 51.4 mm² (FIGS. 18 and 19). Using Equation (11), the drag parameters, $\Omega^R$ and $\Omega_{Control}^L$, were both calculated to be 31.3 mg·mm² for the control trial.

A 110 Hz sinusoidal drive signal with a constant 200V peak-to-peak amplitude was applied to the piezoelectric bimorph actuator. Wing trajectories were recorded using a high-speed video camera operating at 10,000 frames per second, which is approximately 91 frames per wingstroke. Wing angles were extracted from the video stream with image analysis software, producing about 91 data points per wingstroke over 10 wingstrokes for the control trial.

For the one-cut trial, the data collection process was repeated after removing a section of the left wing membrane, reducing the wing planform area to 84.3% of its area in the control trial. The drag parameter was recalculated using Equation (11), resulting in a modified drag parameter, $\Omega_{1-Cut}^L = 18.8$ mg·mm², or 59.9% of $\Omega^R$. The moment of inertia, $I^L$, of the left wing is not appreciably changed by the removal of wing membrane mass. For the two-cut trial, an additional section of wing membrane was removed, leaving 56.8% of the original wing planform, resulting in $\Omega_{2-Cut}^L = 13.2$ mg·mm², or 42.0% of $\Omega^R$. Again, $I^L$ remains effectively constant due to the negligible contribution of the wing membrane mass to the moment of inertia. The wing planforms for all three trials are displayed in FIG. 18-23.

Elastic deformation of the wings resulted in a discrepancy of as much as 8° between the angle of the distal end of the leading wing spar 44 and the angle of the proximal end at the output of the PARITy drivetrain. In order to minimize the impact of this elastic deformation, wing stroke angles were extracted by tracking points on the leading wing spar 44 extending no more than 5 mm from the drivetrain output.

B. Results and Discussion

Figure 27:
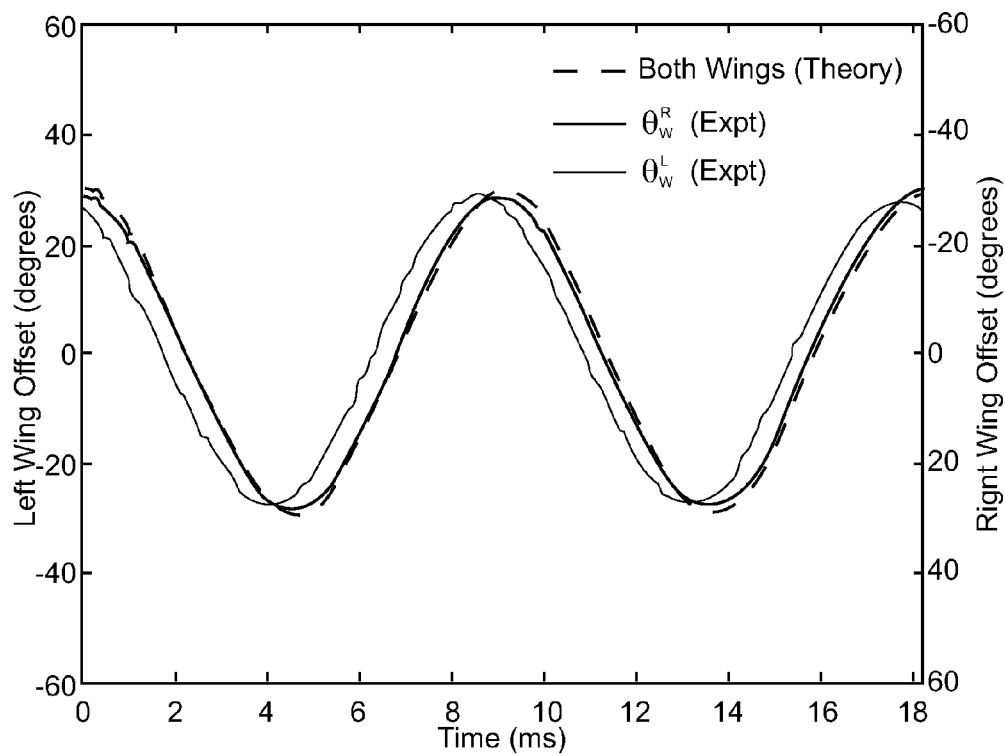
FIG. 27 plots theoretical predictions versus experimental wing trajectories for the control trial.
Figure 28:
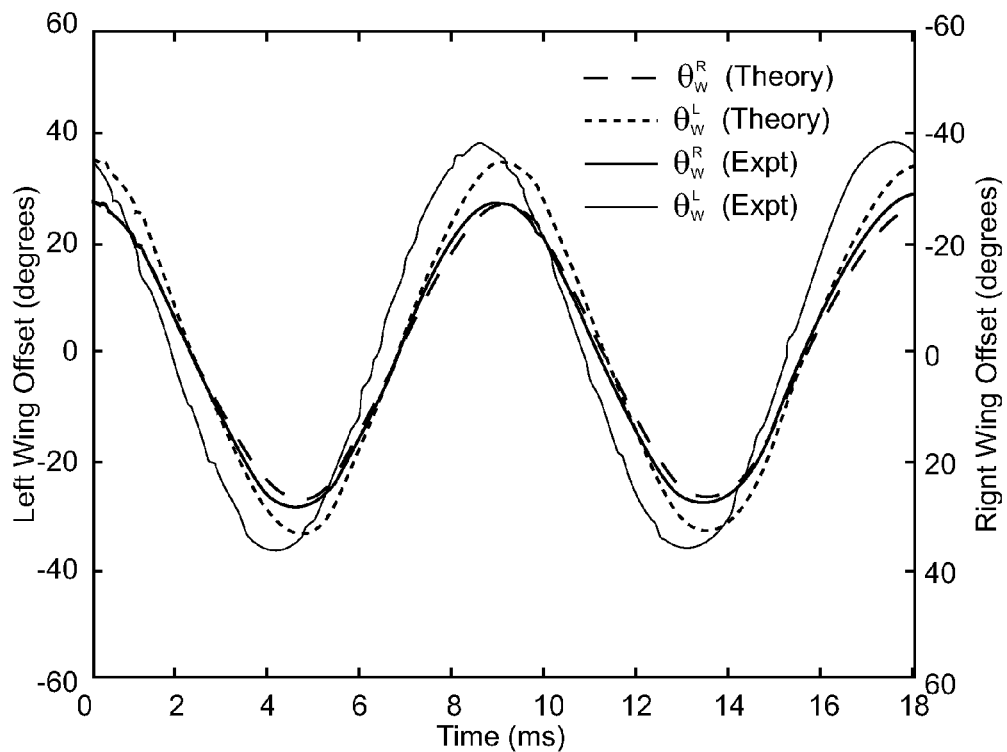
FIG. 28 plots theoretical predictions versus experimental wing trajectories for the one-cut trial.
Figure 29:
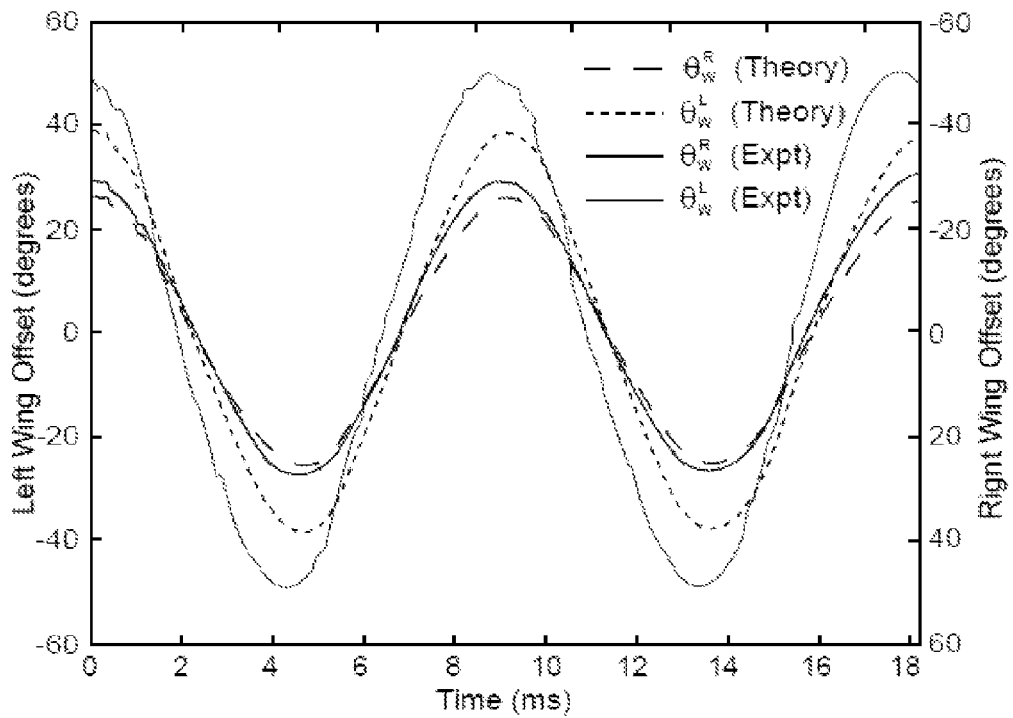
FIG. 29 plots theoretical predictions versus experimental wing trajectories for the two-cut trial.
Figure 30:
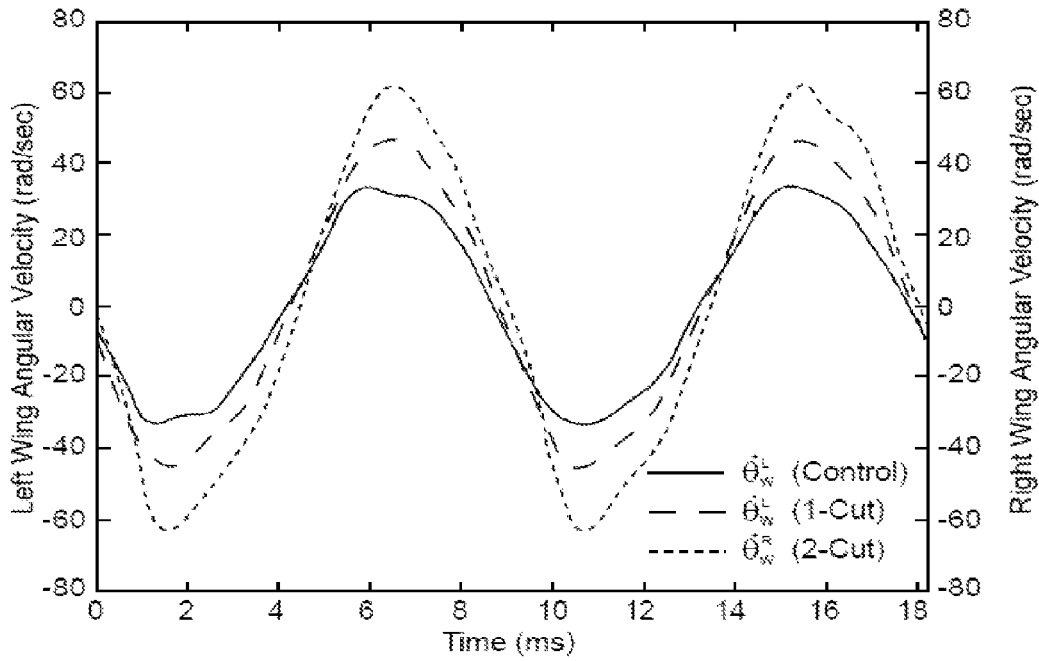
FIG. 30 plots experimentally observed left wing velocities, low-pass filtered with an 800 Hz cutoff frequency.

The experimental wing trajectories for the control, one-cut, and two-cut trials are plotted in FIGS. 27-29, respectively, along with the trajectories predicted by simulation. The phase relationship between the drive signal itself and the wing trajectory data from the video stream was not experimentally recorded. The theoretical predictions were aligned in time with experimental data by matching the phase of the fundamental 110 Hz components of predicted and experimental $\theta_w^R(t)$. This technique does not allow verification of the predicted phase shift between drive signal and wing trajectory, but it allows verification of the relative phase shift between the trajectories of the left and right wings.

In the control trial, the symmetry of the system demands symmetric wing trajectories. Fabrication tolerances, however, have created measurable errors. Two such effects are readily apparent in the experimental data. First, the mean right wing stroke angle is −9.5°, while the mean left wing stroke angle has a magnitude of less than 0.5° (both removed from FIGS. 27-30). Second, the fundamental 110 Hz oscillation of $\theta_w^L(t)$ leads that of $\theta_w^R(t)$ by 0.45 ms, a phase difference equal to 5.0% of a full flapping cycle.

Simulation of the control trial produces mean stroke angles of less than 0.5° in magnitude. The observed mean right wing stroke angle of −9.5° in the experimental trial can be attributed to an offset in the minimum potential energy configuration of the experimental test structure, likely caused by fabrication error. The exact cause of this offset could not be isolated, and it has been removed from plots of experimental data.

Figure 11:
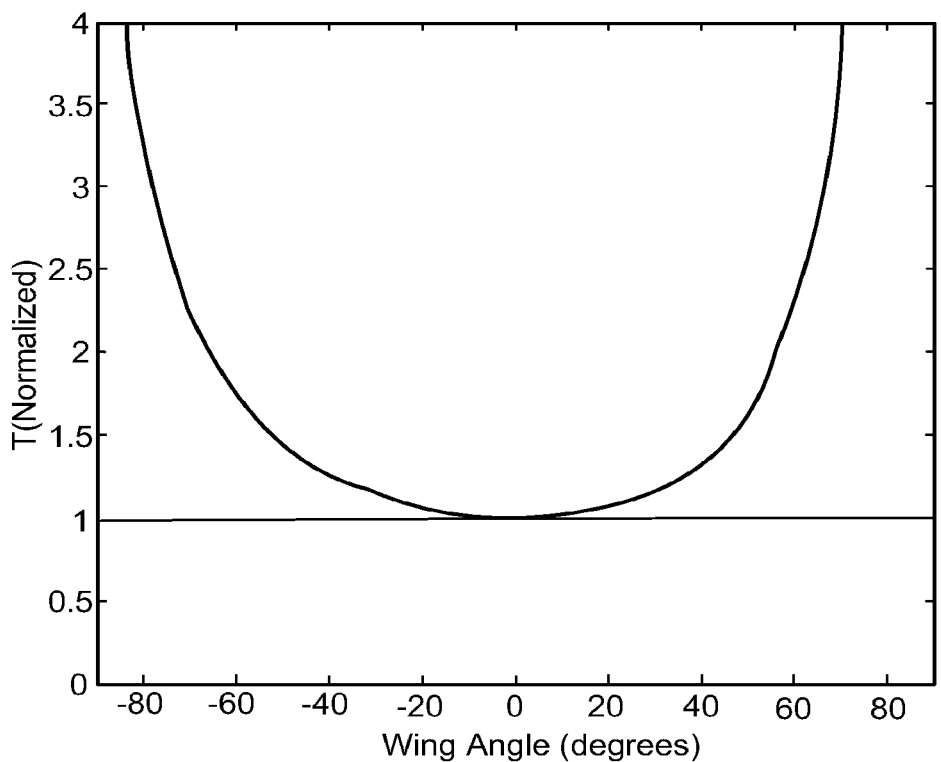
FIG. 11 plots the torque transmission ratio, $T^R(q_1, q_2)$ (normalized to its neutral configuration value of −6.25), plotted as a function of wing angle, $\theta_w^R(q_1, q_2)$, for the simulated and constructed PARITy design under the expected operating condition, $q_2=0$.

The removal of the mean stroke angle is expected to have only a minor impact on the predicted wing trajectory because, when the wing is less than 40° from horizontal, the transmission ratio is relatively insensitive to wing angle (see FIG. 11). However, the two-cut experimental trial has a stroke amplitude approaching ±50°, so the non-zero mean stroke angle may contribute to the discrepancy between theory and experiment in this trial.

The phase difference of wing trajectories in the control trial can be seen in FIG. 27. A symmetric system should not exhibit any phase difference, but there are many possible asymmetries that can cause it. A difference between torsion spring constants in the transmission can lead to phase errors, as can mismatched wing inertias or transmission ratios caused by fabrication variation.

However, these asymmetries aside, FIGS. 28 and 29 provide clear evidence that the PARITy drivetrain manages the distribution of actuator power to compensate for asymmetric loading torques. The stroke amplitude of the left wing is increased in the one-cut trial to compensate for its reduced membrane area. It is larger still in the two-cut trial, where even more membrane area has been removed. The predicted wing trajectories demonstrate close, if not perfect, agreement with the experimental data. The increase in wing velocity as membrane is removed can be seen more clearly in FIG. 30.

The experimental wing trajectories correspond well with theoretical predictions of the simulation model. The theoretical model slightly underestimates the stroke amplitude increase of the altered wing in both the one-cut and two-cut trials, an effect which can be attributed to overestimation of the drag parameters assigned to the complex altered wing planforms used in these trials. Though the drag torques were not directly measured in this test setup, the increased stroke amplitude of the wing with a reduced planform area is indirect evidence of the drag torque balancing nature of the PARITy drivetrain. Using a passive mechanism, the PARITy distributes power from the drive actuator in a manner that compensates for the altered wing's reduced capacity to induce aerodynamic drag torques.

Figure 31:
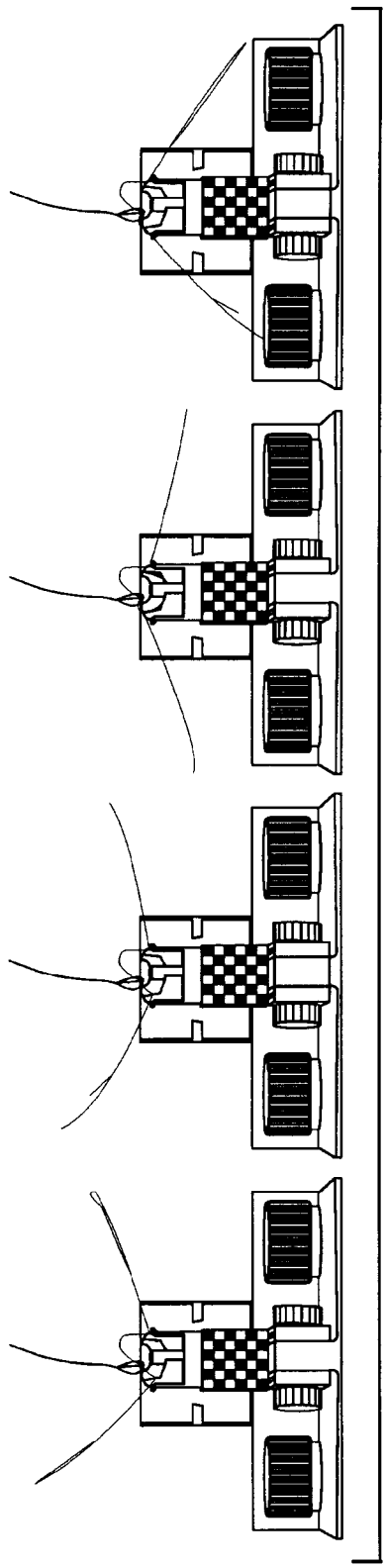
FIG. 31 is an image sequence from the two-cut trial at high speed, illustrating increased amplitude, $\theta_w^L$, compared to $\theta_w^R$.

An image sequence from the two-cut trial at high speed, illustrating increased amplitude $\theta_w^L$ compared to $\theta_w^L$, is shown in FIG. 31. The elapsed time between adjacent images is 1.5 milliseconds. The checkerboard contains 1 mm×1 mm squares and is used for scale.

5. Control Actuator for Steering

The above-described PARITy drivetrain passively balances wing torques; a properly operating system will regulate wing torques such that their magnitudes are instantaneously equal over the entire wingstroke. This passive regulation of torques operates on a timescale shorter than the wingstroke period. In the present embodiment, a wingstroke occurs in approximately 10 ms, while passive torque regulation recovers from perturbations in approximately 1 ms (FIGS. 15-17).

The PARITy mechanism lends itself to a novel control paradigm, fundamentally different from the active wing trajectory control approach that is standard throughout the art. Though the present embodiment passively regulates wing torques such that they are equal, perturbing system dynamics with a control input can bias the passive system, causing it to regulate wing torques to a non-balanced setpoint.

For example, active biasing of the PARITy drivetrain can passively regulate the left wing torque to be 10% higher than the right wing torque or vice versa. The percentage imbalance can be continuously controlled by an active kinematic input that is modulated on a timescale much slower than that of the passive mechanism, e.g., greater than ten times the 1 ms timescale of the passive system in the described embodiment of the PARITy drivetrain. This active control input provides direct control over torques imparted by the wings, passively compensating for complex aerodynamic effects and simplifying control design.

Figure 36:
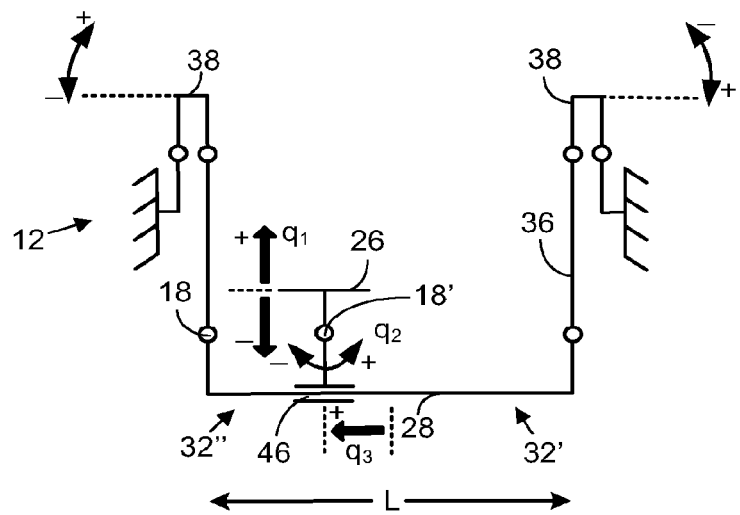
FIG. 36 illustrates a PARITy drivetrain including a prismatic joint driven by an additional (control) actuator to provide active steering control.

This direct torque control can be achieved in many ways not limited to the following three incarnations. In the first incarnation, a prismatic joint 46 is added to the input platform (FIG. 36). In this design, $q_1$ accepts power input while $q_2$ is passively determined, as before. The input, $q_3$, which can be supplied via a control actuator in the form of an additional piezoelectric bimorph cantilever incorporated into the device acting on the prismatic (sliding) joint, is the active control input (actuator) and is modulated slower than the timescale of the passive system. In one embodiment, this control actuator can be mounted in series with the drive actuator (e.g., mounted on the first cantilever in an orientation orthogonal to that of the first cantilever for displacing the input platform side-to-side in the illustrated $q_3$ direction). In this design, the passive system will regulate the ratio, $\tau_w^L/\tau_w^R = (L/2+q_3)/(L/2-q_3)$, with $q_3=0$ achieving perfectly balanced wing torques. Note that the control input, $q_3$, provides direct control over wing torques thanks to the novel passive mechanism. For example, setting $q_3=L/6$ will achieve $\tau_w^L=2*\tau_w^R$. This direct control allowed by passive mechanisms should greatly simplify control system design.

Figure 37:
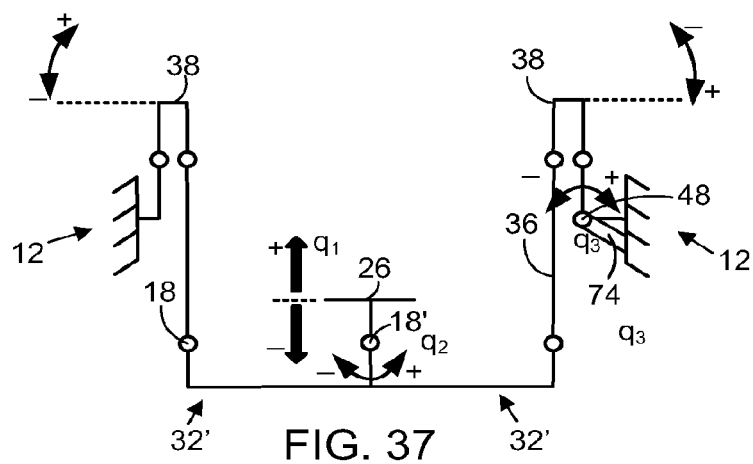
FIG. 37 illustrates a PARITy drivetrain including an additional revolute joint driven by a control actuator to provide active steering control.

A second incarnation of an active control design is presented in FIG. 37, where an additional revolute joint 48 at $q_3$ is used to change the transmission ratio, $T^R$. Again, the ratio, $\tau_w^L/\tau_w^R$, becomes dependent on $q_3$, but the expression is more complicated. A control actuator 74 mounted to the airframe and in the form of, for example, either a twisting piezoelectric actuator or a standard cantilever acting through an appropriate transmission, such as a slider crank, acting on the revolute joint to produce axial rotation, as shown by $q_3$.

Figure 38:
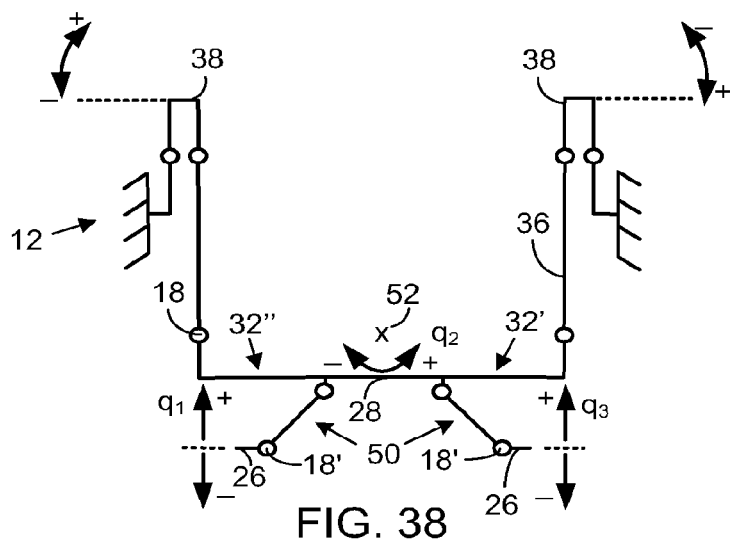
FIG. 38 illustrates a PARITy drivetrain including a virtual joint driven by a control actuator to provide active steering control.

For small rotations, a twin-blade flexure structure 50 rotates about the virtual intersection of the two blades. In a third incarnation (FIG. 38), this intersection is indicated by an "x" 52; and the degree of freedom, $q_2$, is passive but now represents a rotation about this virtual center of revolution. Power is applied by actuating input platforms 26 via $q_1$ and $q_3$ on symmetric reciprocating trajectories. Control is realized by applying an offset between $q_1$ and $q_3$, which moves the virtual rotation point, x 52. The ratio, $\tau_w^L/\tau_w^R$, is a function of this offset. The actuation can be provided by, for example, a pair of cantilevers respectively driving $q_1$ and $q_3$, wherein the average displacement of the cantilevers drives the wing, while the difference in displacement is the control signal.

While much of the above discussion has focused on the utilization of these inventions in the context of a micro-robotic flight device, the frame, under-actuated drivetrain and end effectors, optionally with other components, can be used in other applications, particularly those in which torque balancing with reciprocating motion is desirable. In one alternative embodiment, the apparatus and methods can be employed to produce a robotic swimming device.

Additionally, in describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A passively torque-balanced device comprising:
   a frame;
   a powered and automated drive actuator mounted to the frame and configured for reciprocating displacement;
   a fulcrum joint coupled with the powered drive actuator;
   a proximate balancing link coupled with the powered drive actuator through the fulcrum joint and configured for displacement by the drive actuator;
   a first plurality of rigid links coupled with the proximate balancing link at a first end region of the proximate balancing link;
   a second plurality of rigid links coupled with the proximate balancing link at a second end region of the proximate balancing link, wherein the first and second end regions of the proximate balancing link respectively include opposite ends of the proximate balancing link;

a plurality of joints, wherein at least one joint couples the first plurality of rigid links with the proximate balancing link at the first end region of the proximate balancing link, wherein at least one other joint couples the second plurality of rigid links with the proximate balancing link at the second end region of the proximate balancing link, wherein a first set of additional joints couples the first plurality of rigid links with each other in series, and wherein a second set of additional joints couples the second plurality of rigid links with each other in series, wherein the joints provide the rigid links with a plurality of non-fully actuated degrees of freedom for displacement of the rigid links; and at least two end effectors, wherein a first end effector is coupled with the first plurality of rigid links, and wherein a second end effector is coupled with the second plurality of rigid links, and wherein each end effector is configured for displacement without full actuation.

2. The device of claim 1, wherein the joints provide at least one of the rigid links with at least three non-fully actuated degrees of freedom for displacement.

3. The device of claim 1, wherein the end effectors comprise a pair of wings configured for generating aerodynamic lift for flight of the device via a flapping wing stroke effected by the reciprocating displacement of the drive actuator.

4. The device of claim 3, wherein the wings are connected to the rigid links via spars, wherein the wings are passively pivotable about the longitudinal axis of the spars.

5. The device of claim 3, wherein each dimension of the device is less than 10 cm.

6. The device of claim 1, wherein the rigid links comprise rigid layer segments sandwiched around a comparatively flexible strip, and wherein gaps are provided between rigid layer segments, exposing the flexible strip to serve as the joints in the gaps.

7. The device of claim 6, wherein the rigid layer segments comprise a fiber-reinforced composite.

8. The device of claim 6, wherein the flexible strip comprises polyimide.

9. The device of claim 1, further comprising a voltage source mounted to the frame and coupled with the drive actuator to power the reciprocating displacement of the drive actuator.

10. The device of claim 1, further comprising at least one device selected from a camera, a sensor, an electronic communication transmitter, and an electronic communication receiver mounted to the frame.

11. The device of claim 1, further comprising a control actuator coupled with at least one of the rigid links, supplementing and configured to steer the device when the device is displaced by the end effectors.

12. The device of claim 1, wherein the drive actuator comprises a piezoelectric bimorph cantilever.

13. A method for generating passively torque-balanced displacement, the method comprising:
providing a device comprising:
i) is frame;
ii) a powered and automated drive actuator mounted to the frame;
iii) a fulcrum joint coupled with the powered drive actuator;
iv) a proximate balancing link coupled with the powered drive actuator through the fulcrum joint;
v) a first plurality of rigid links coupled with the proximate balancing link at a first end region of the proximate balancing link;
vi) a second plurality of rigid links coupled with the proximate balancing link at a second end region of the proximate balancing link, wherein the first and second end regions of the proximate balancing link respectively include opposite ends of the proximate balancing link;
vii) a plurality of joints, wherein at least one joint couples the first plurality of rigid links with the proximate balancing link at the first end region of the proximate balancing link, wherein at least one other joint couples the second plurality of rigid links with the proximate balancing link at the second end region of the proximate balancing link, wherein a first set of additional joints couples the first plurality of rigid links with each other in series, and wherein a second set of additional joints couples the second plurality of rigid links with each other in series; and
viii) at least a first and second end effector, wherein the first end effector is coupled with the first plurality of rigid links, and wherein the second end effector is coupled with the second plurality of rigid links;

generating reciprocating displacement of the drive actuator;

mapping the reciprocating displacement of the drive actuator through the fulcrum joint to the proximate balancing link to displace the proximate balancing link;

mapping the displacement of the proximate balancing link (a) through at least one joint to displace rigid links in the first plurality of rigid links without full actuation and (b) through at least one additional joint to displace rigid links in the second plurality of rigid links without full actuation; and mapping the displacement of the first and second remote links to the end effectors respectively joined to the first and second remote links to reciprocatively displace the end effectors.

14. The method of claim 13, further comprising displacing the device by the reciprocative displacement of the end effectors.

15. The method of claim 14, wherein the end effectors are wings, and further comprising generating lift and flight of the device by the reciprocative displacement of the wings.

16. The method of claim 13, further comprising balancing torque realized at each end effector by passively altering apportionment of power from the displacement of the drive actuator at the proximate link.

17. The method of claim 16, wherein the end effectors are reciprocatively displaced with non-symmetric trajectories.

18. The method of claim 13, wherein the drive actuator reciprocally displaced at a resonant frequency of the device.

19. The method of claim 13, wherein the drive actuator is reciprocally displaced at an oscillation rate of at least 40 Hz.

20. The method of claim 13, wherein the drive actuator is reciprocated with a sinusoidal displacement over time.

* * * * *